(12) United States Patent
Kanda

(10) Patent No.: US 11,068,072 B2
(45) Date of Patent: *Jul. 20, 2021

(54) MIXED REALITY DISPLAY SYSTEM AND MIXED REALITY DISPLAY TERMINAL

(71) Applicant: Maxell, Ltd., Kyoto (JP)

(72) Inventor: Naoyuki Kanda, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/990,027

(22) Filed: Aug. 11, 2020

(65) Prior Publication Data

US 2020/0371602 A1    Nov. 26, 2020

Related U.S. Application Data

(63) Continuation of application No. 16/606,797, filed as application No. PCT/JP2017/020951 on Jun. 6, 2017, now Pat. No. 10,775,897.

(51) Int. Cl.
*G06F 3/01* (2006.01)
*G02B 27/01* (2006.01)
(Continued)

(52) U.S. Cl.
CPC ........... *G06F 3/017* (2013.01); *G02B 27/017* (2013.01); *G06K 9/00671* (2013.01); *G06T 19/006* (2013.01)

(58) Field of Classification Search
None
See application file for complete search history.

(56) References Cited

U.S. PATENT DOCUMENTS

| 2004/0004626 A1 | 1/2004 | Ida et al. |
| 2008/0005702 A1* | 1/2008 | Skourup ............. G06F 3/011 715/848 |

(Continued)

FOREIGN PATENT DOCUMENTS

| JP | 2016-045623 A | 4/2016 |
| JP | 2016-525741 A | 8/2016 |

OTHER PUBLICATIONS

Ren Zhou, et al. "Robust Hand Gesture Recognition with Kinect Sensor." Proceedings of the 19th ACM international conference on Multimedia. ACM. 2011.

(Continued)

*Primary Examiner* — Frank S Chen

(74) *Attorney, Agent, or Firm* — Mattingly & Malur, PC

(57) ABSTRACT

In a mixed reality display system, a server and a plurality of mixed reality display terminals are connected, and virtual objects are displayed. The virtual objects include a shared virtual object for which a plurality of terminals have an operation authority and a private virtual object for which only a specific terminal has an operation authority. The server has virtual object attribute information for displaying the virtual objects in each terminal, and each terminal has a motion detecting unit that detects a motion of a user for switching between the shared virtual object and the private virtual object. When a detection result by the motion detecting unit is received from the terminal, the server updates the virtual object attribute information depending on whether the virtual object is the shared virtual object or the private virtual object, and transmits data of the virtual object after the update to each terminal.

8 Claims, 26 Drawing Sheets

(51) Int. Cl.
*G06K 9/00* (2006.01)
*G06T 19/00* (2011.01)

(56) References Cited

U.S. PATENT DOCUMENTS

| | | |
|---|---|---|
| 2008/0285892 A1 | 11/2008 | Sposato et al. |
| 2012/0194645 A1 | 8/2012 | Fuller et al. |
| 2013/0335405 A1 | 12/2013 | Scavezze et al. |
| 2014/0368537 A1 | 12/2014 | Salter et al. |
| 2015/0149929 A1* | 5/2015 | Shepherd .............. H04L 65/403 715/753 |
| 2016/0353062 A1 | 12/2016 | Ono et al. |
| 2017/0034227 A1* | 2/2017 | Yang ................... H04L 65/4038 |
| 2017/0236492 A1 | 8/2017 | Taki et al. |

OTHER PUBLICATIONS

International Search Report and Written Opinion of PCT/JP2017/020951 dated Jul. 17, 2018.
Extended European Search Report received in corresponding European Application No. 17913032.3 dated Dec. 4, 2020.

\* cited by examiner

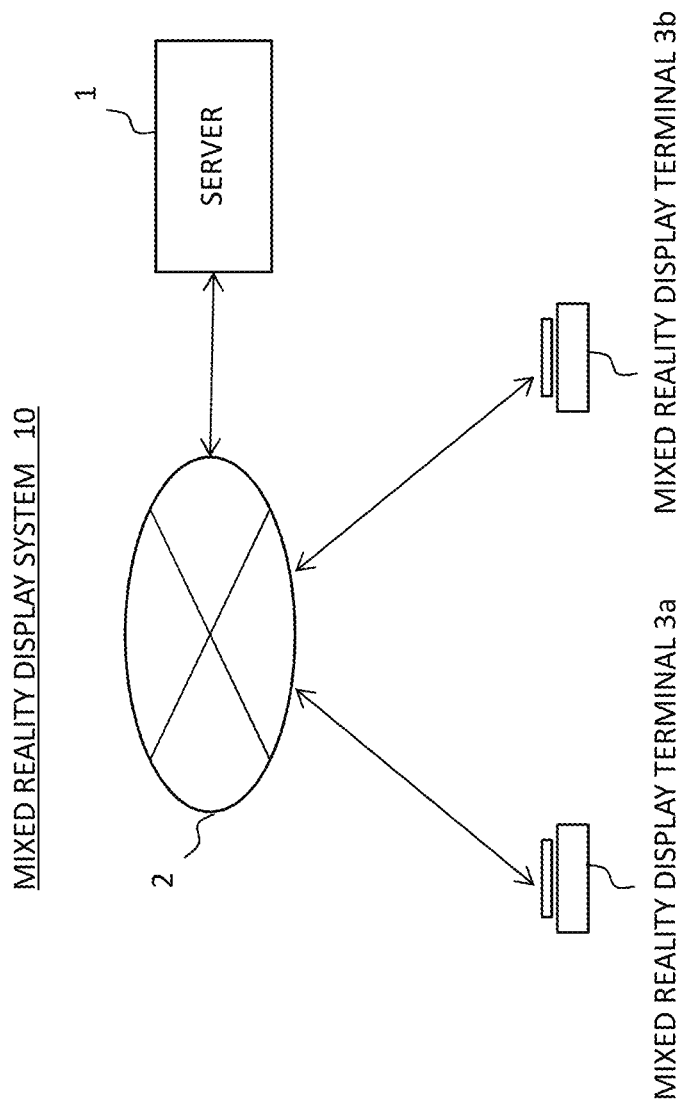

FIG. 4A

VIRTUAL OBJECT ATTRIBUTE INFORMATION 239

| 401 | 402 | 403 | 404 | 405 | 406 | 407 | 408 | 409 |
|---|---|---|---|---|---|---|---|---|
| VIRTUAL OBJECT ID | VIRTUAL OBJECT NAME | DIRECTION | POSITION | COLOR/SHAPE | COPY SOURCE | COPY DESTINATION | OPERATION AUTHORITY | SHARED /PRIVATE |
| VIRTUAL OBJECT 1 | RECTANGLE | 90, 85 | 100, 50, 75 | COLOR/SHAPE DATA 1 | - | - | USER 1 | PRIVATE |
| VIRTUAL OBJECT 2 | CIRCLE | 75, 0 | 200, 20, 300 | COLOR/SHAPE DATA 2 | - | - | USER 1, GROUP 2 | SHARED |
| VIRTUAL OBJECT 3 | TRIANGLE | -80, 90 | 150, 50, 25 | COLOR/SHAPE DATA 3 | - | VIRTUAL OBJECT 4 | USER 1, GROUP 2, ALL MEMBERS | SHARED |
| VIRTUAL OBJECT 4 | TRIANGLE | 90, 85 | 100, 50, 75 | COLOR/SHAPE DATA 4 | VIRTUAL OBJECT 3 | - | USER 1 | PRIVATE |
| ... | ... | ... | ... | ... | ... | ... | ... | |

FIG. 4B

USER AUTHENTICATION INFORMATION 240

| USER ID (411) | USER PASSWORD (412) |
|---|---|
| USER 1 | △△△△ |
| USER 2 | ☐☐☐☐ |
| ... | ... |

FIG. 4C

DEVICE MANAGEMENT INFORMATION 241

| DEVICE ID (421) | DEVICE NAME (422) | DEVICE PASSWORD (423) | DEVICE IP ADDRESS (424) |
|---|---|---|---|
| xxx-xxx-xxx | L42-XP07 | △△△△ | 192.168.20.1 |
| xxx-xxx-xxx | L32-XP05 | ☐☐☐☐ | 192.168.20.2 |
| ... | ... | ... | ... |

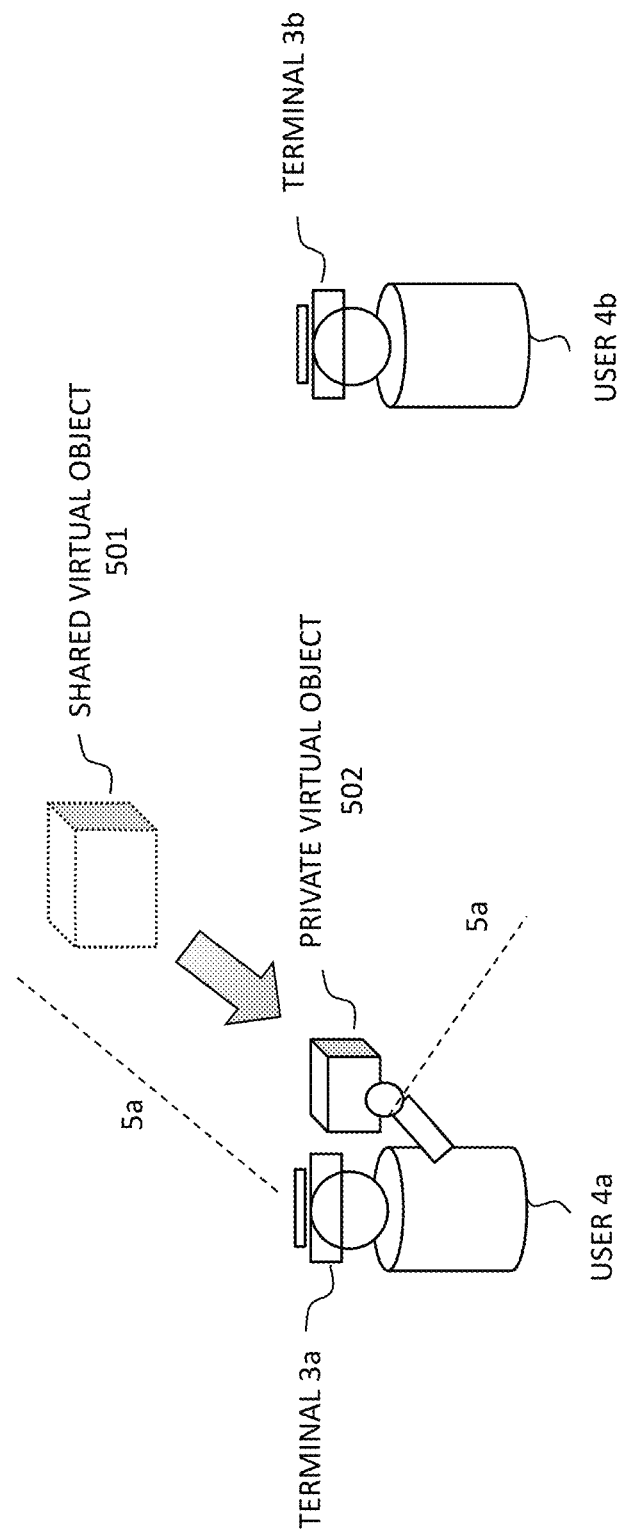

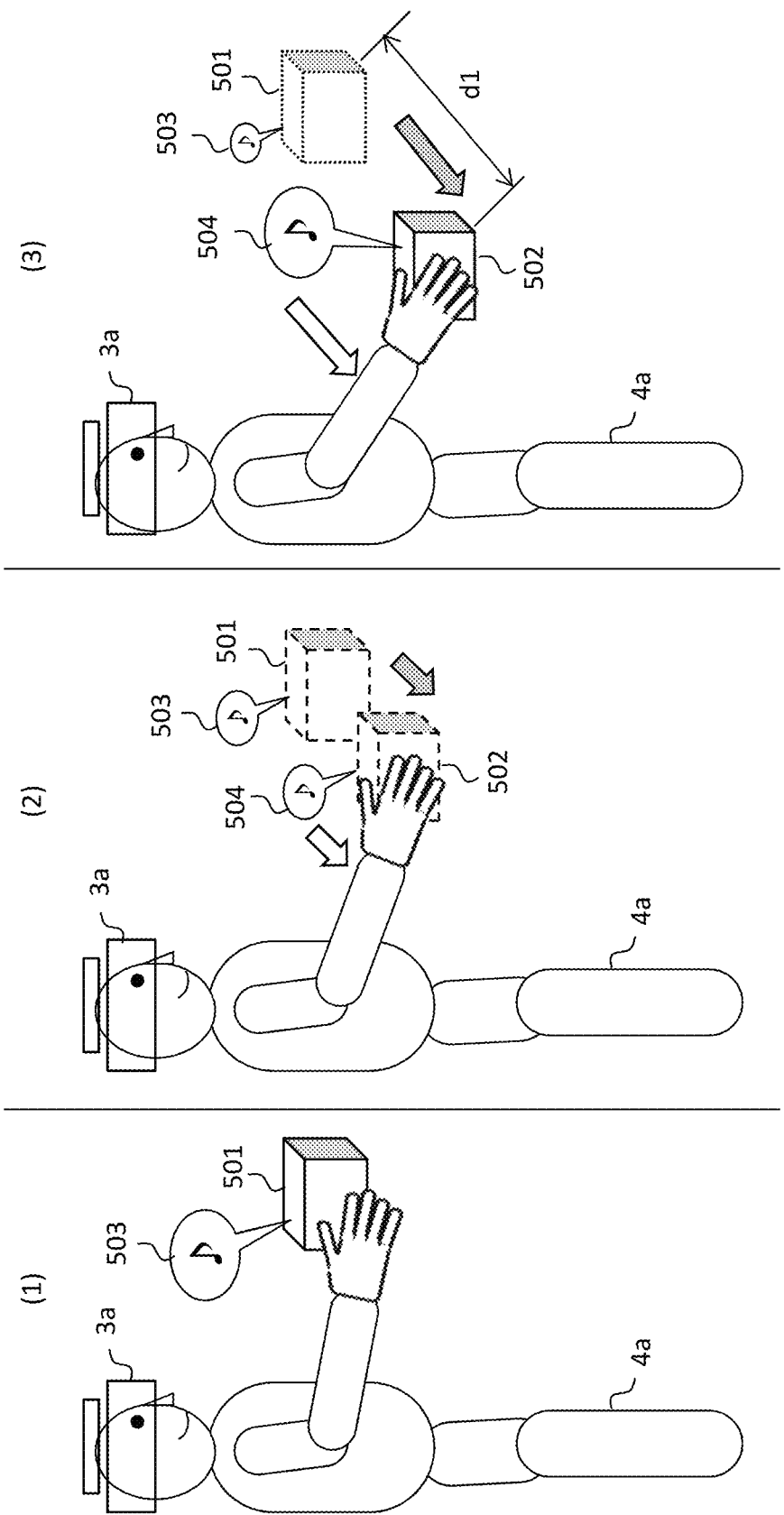

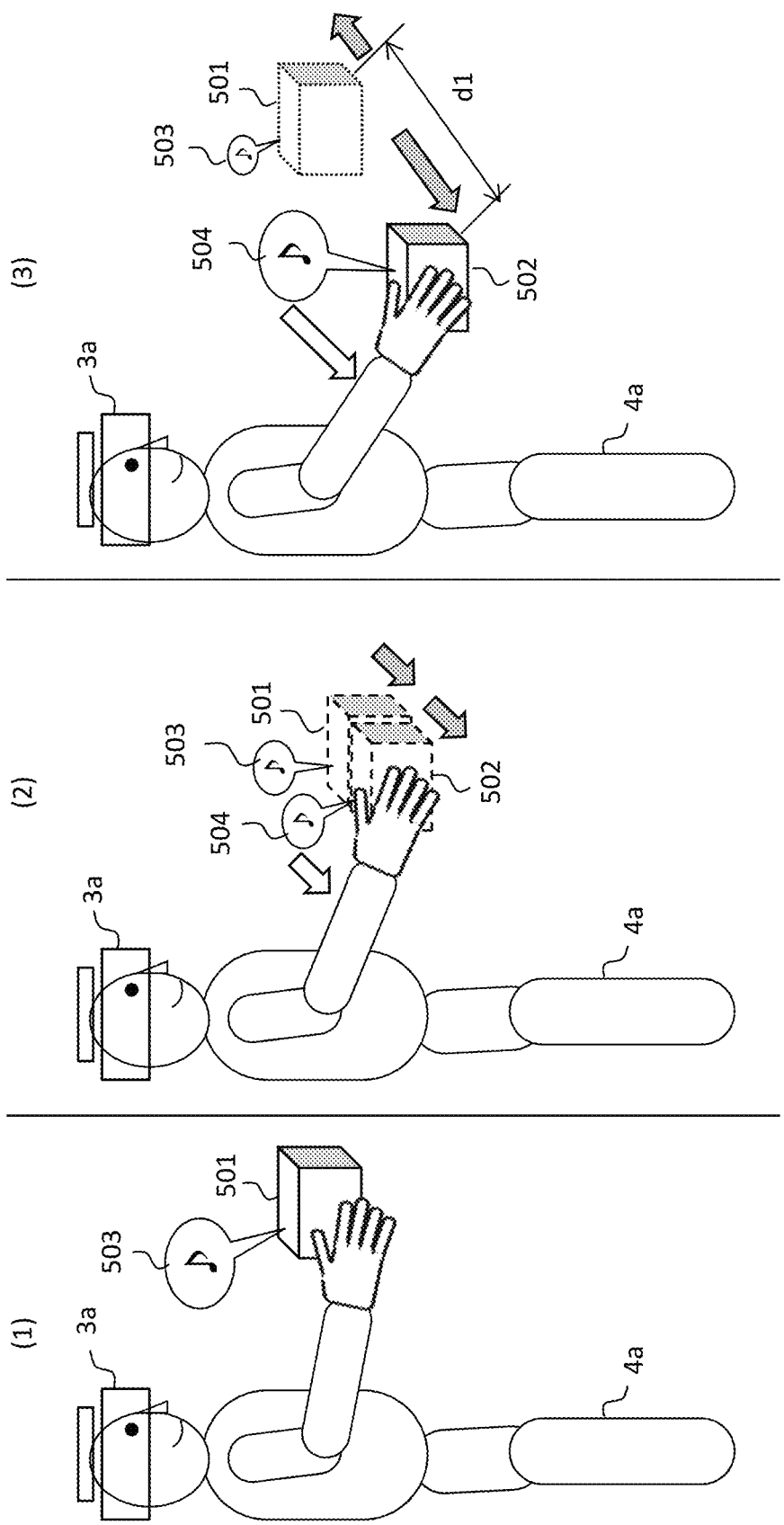

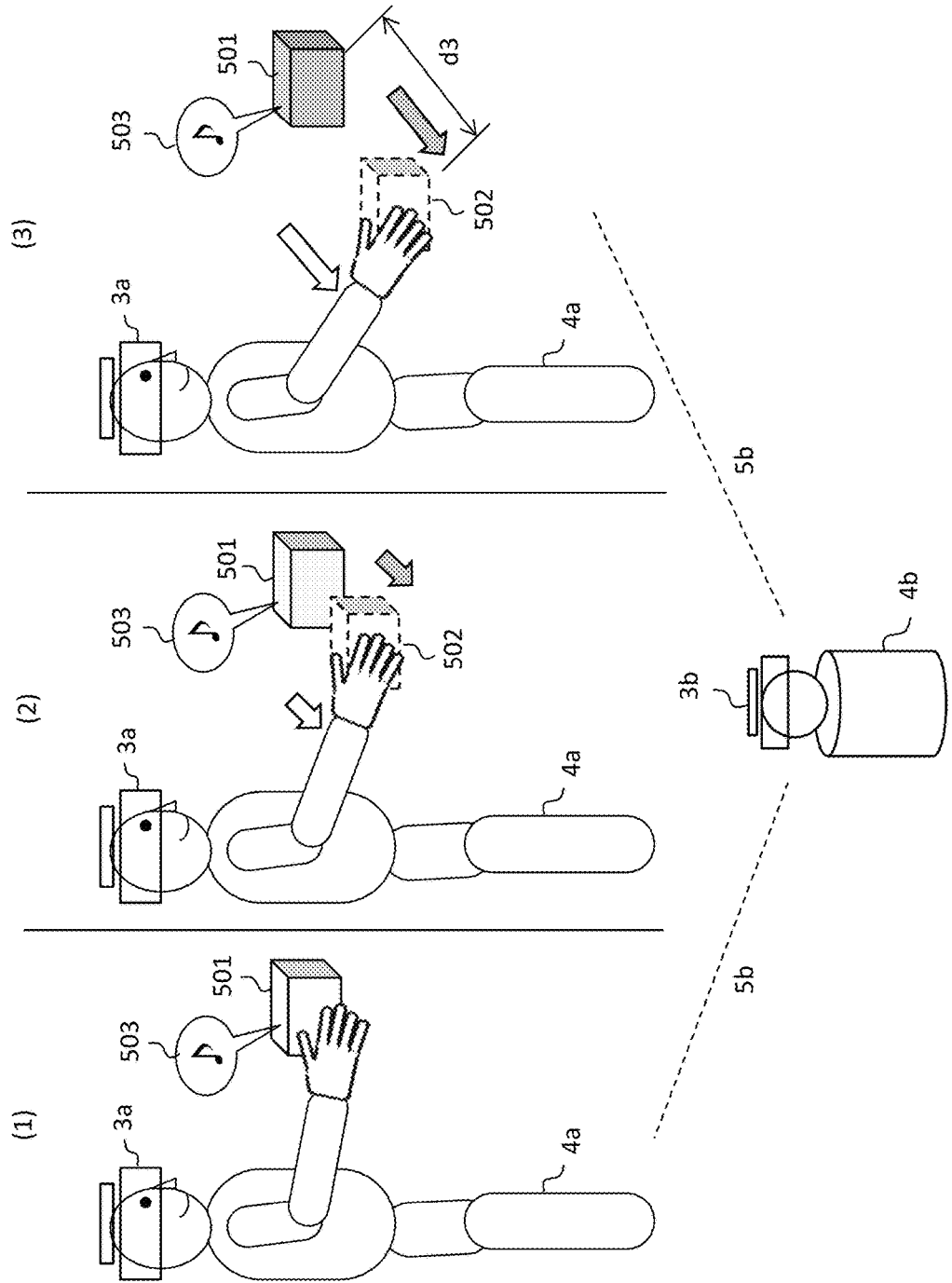

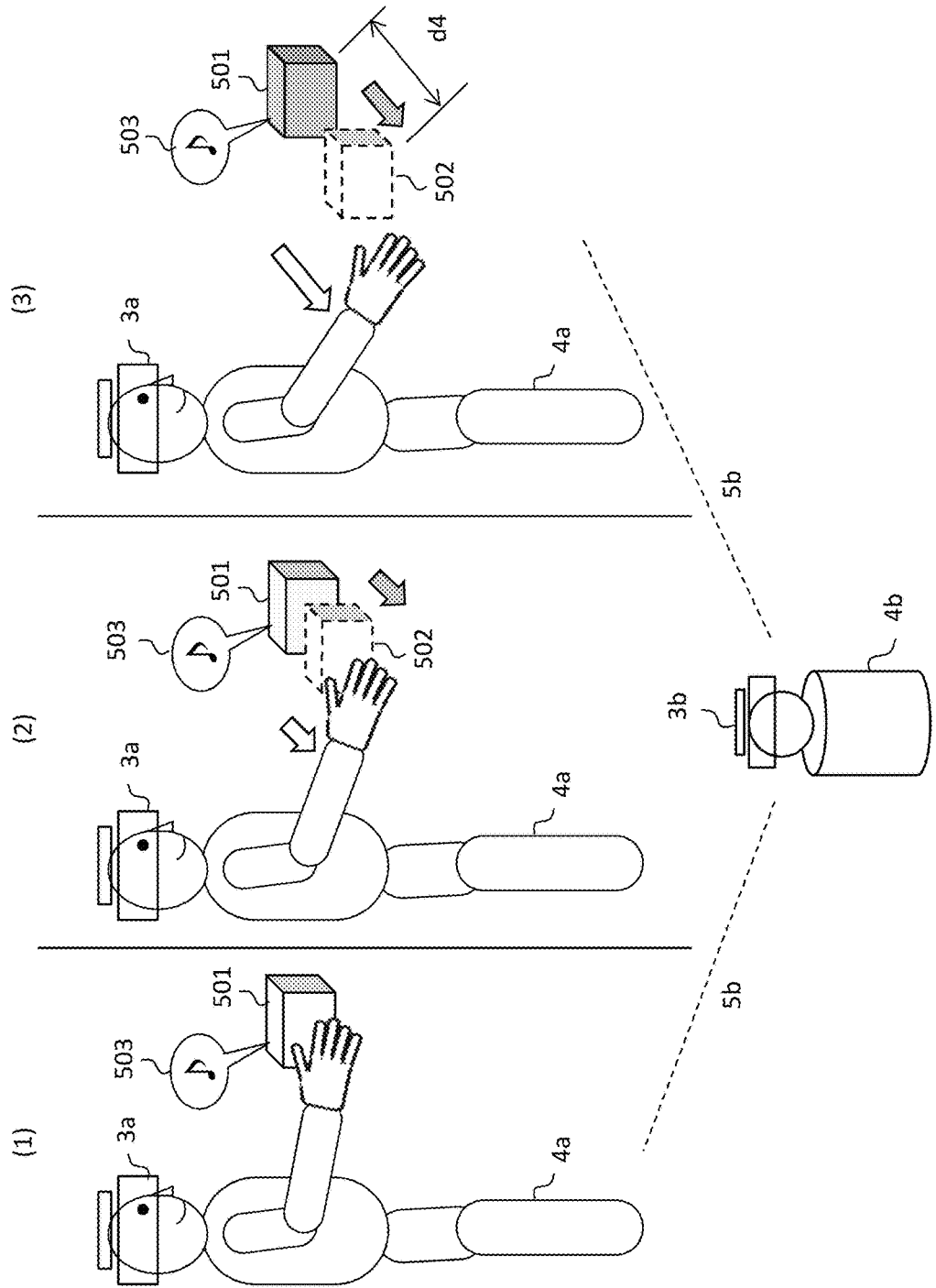

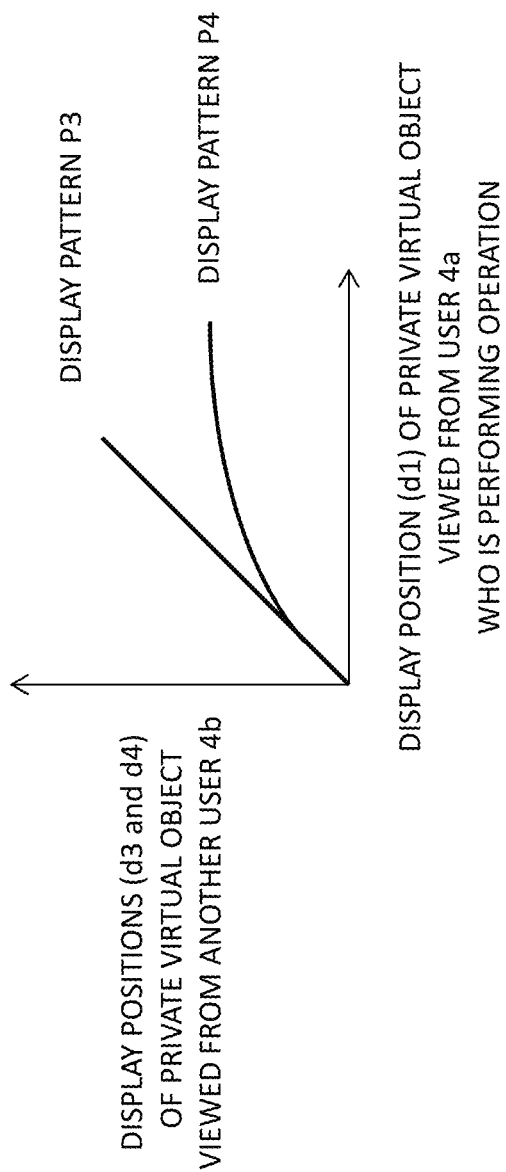

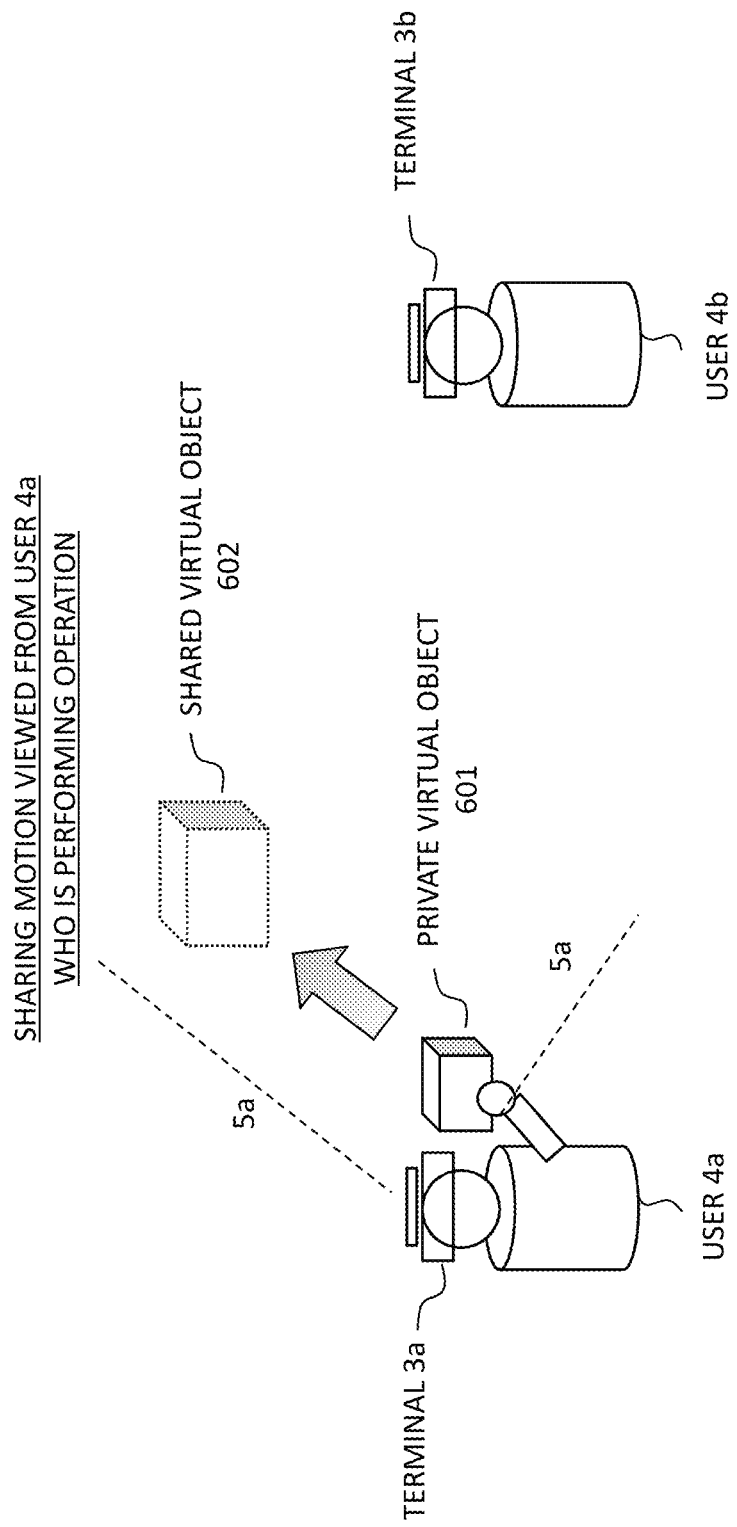

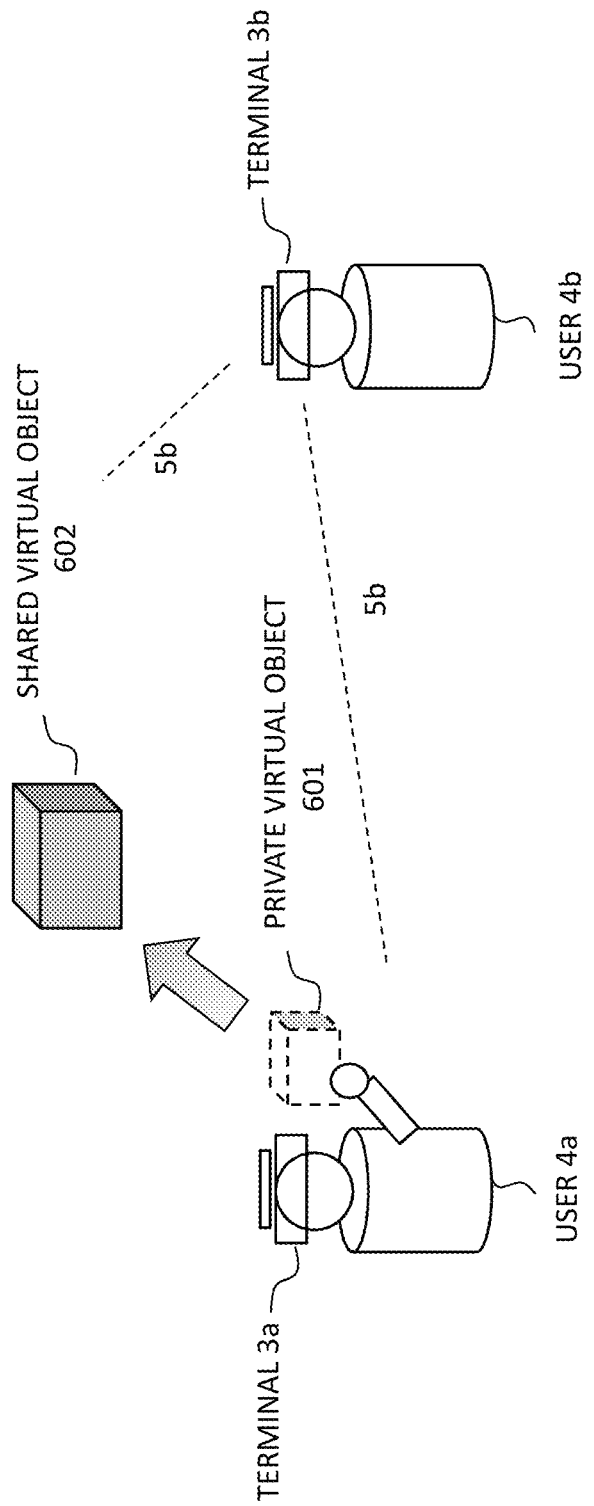

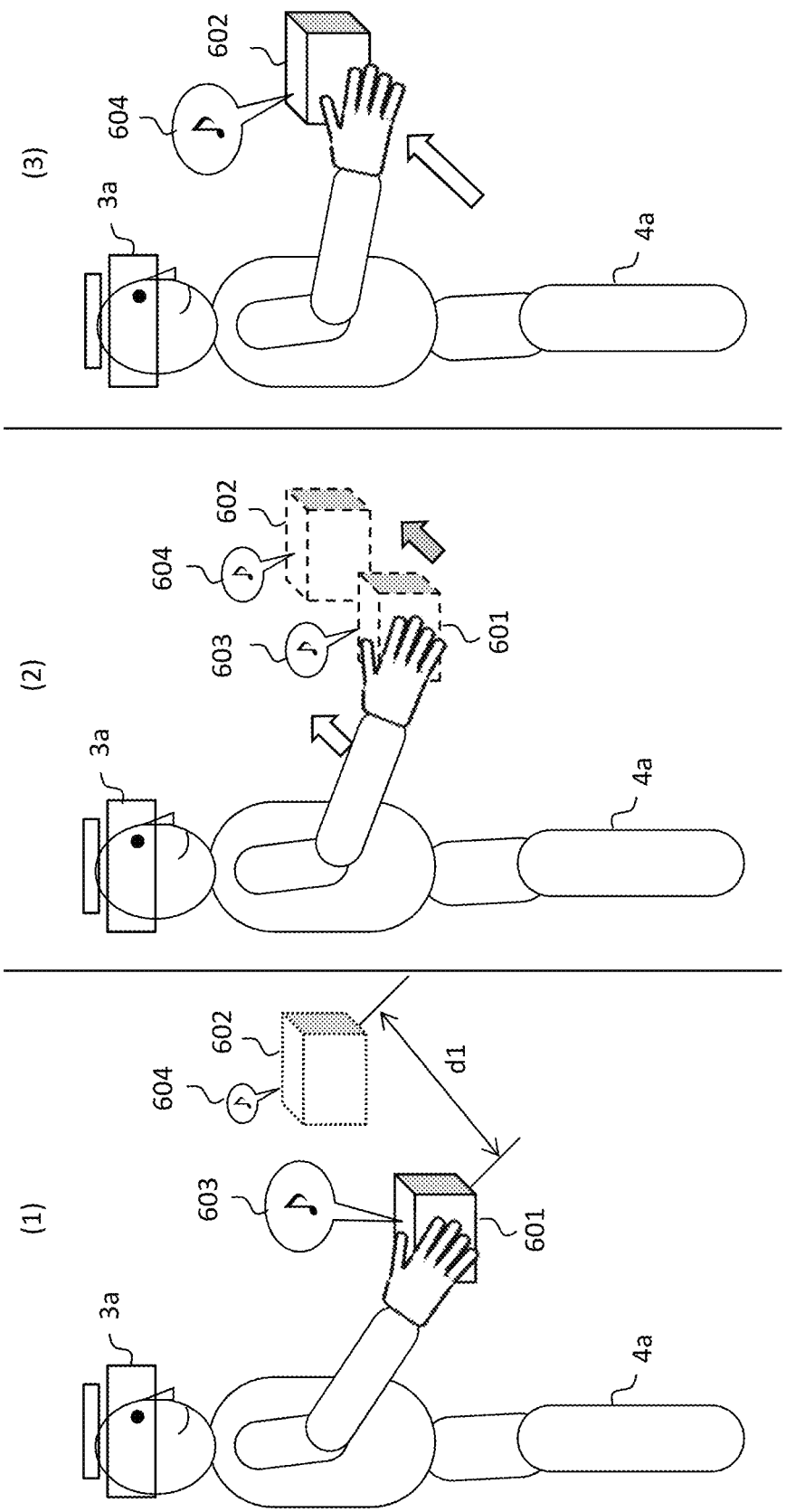

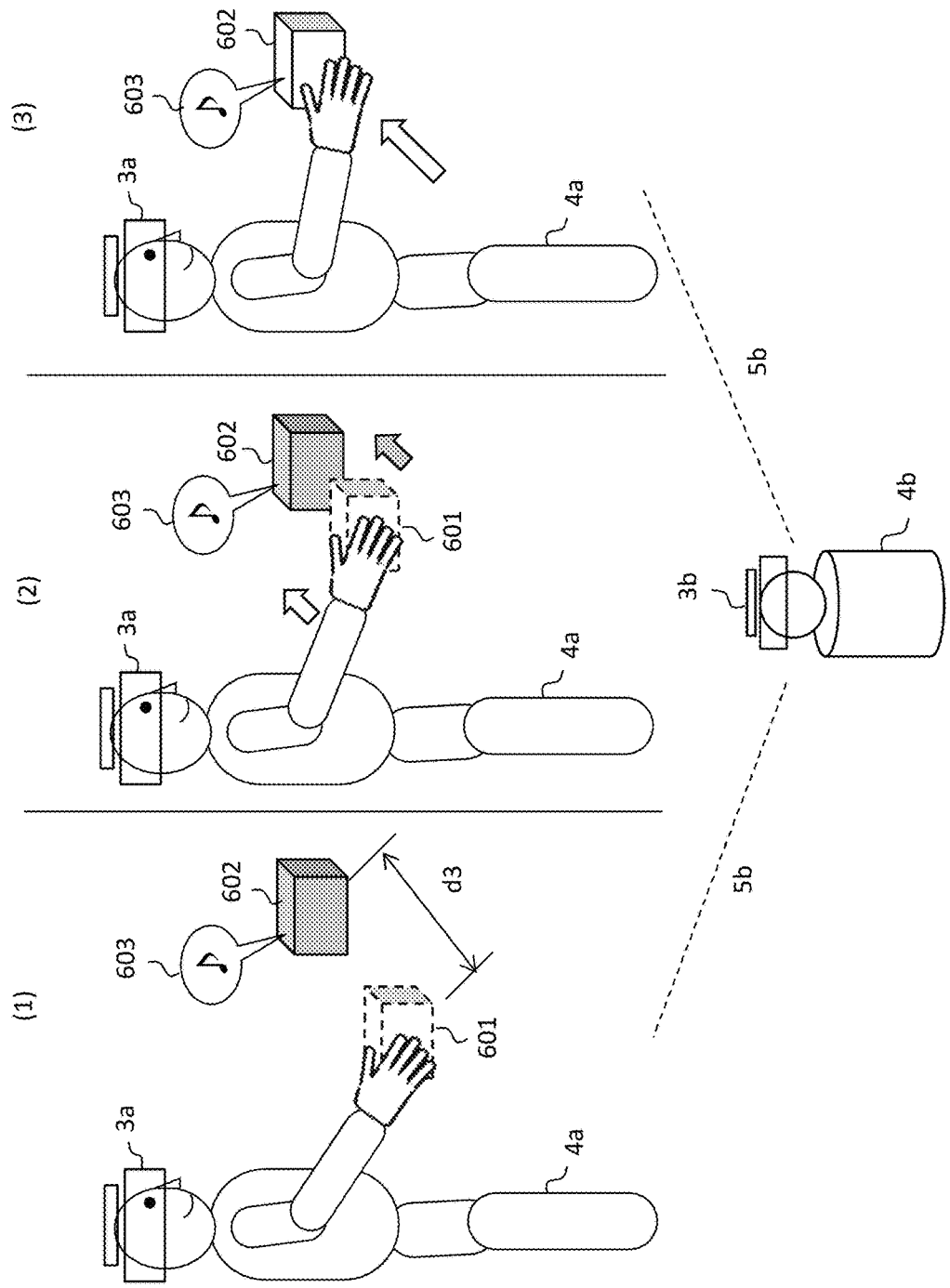

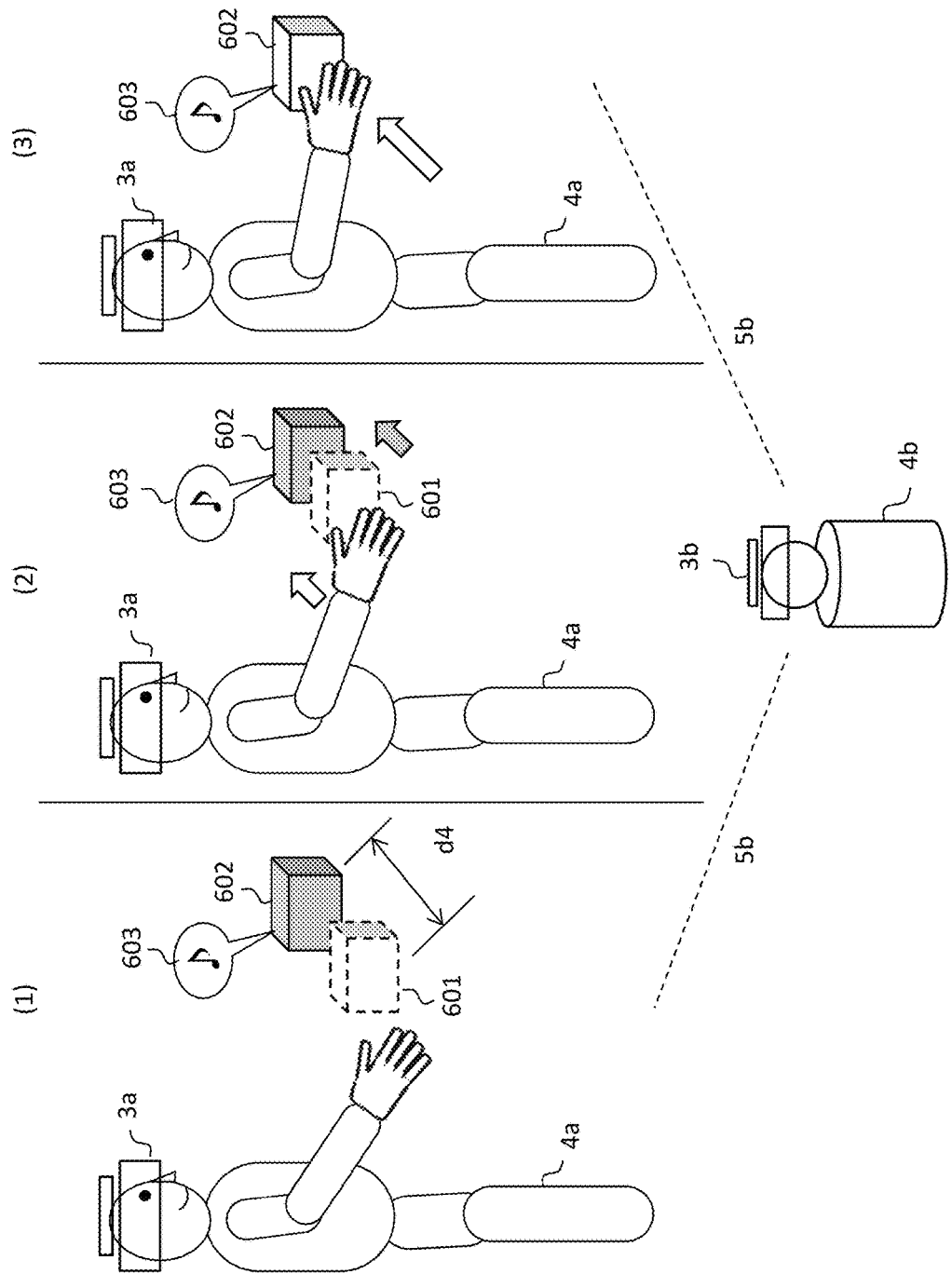

VIRTUAL OBJECT SHAPE DECISION BY SHARING MOTION

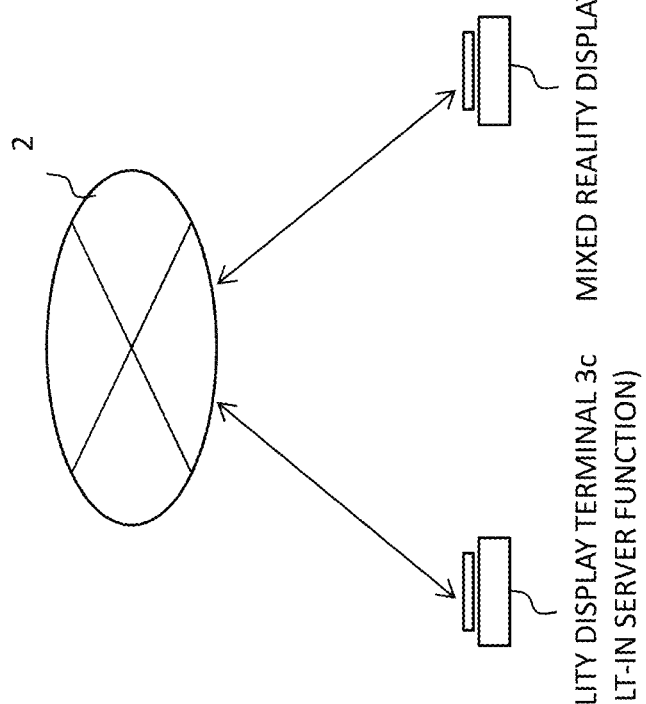

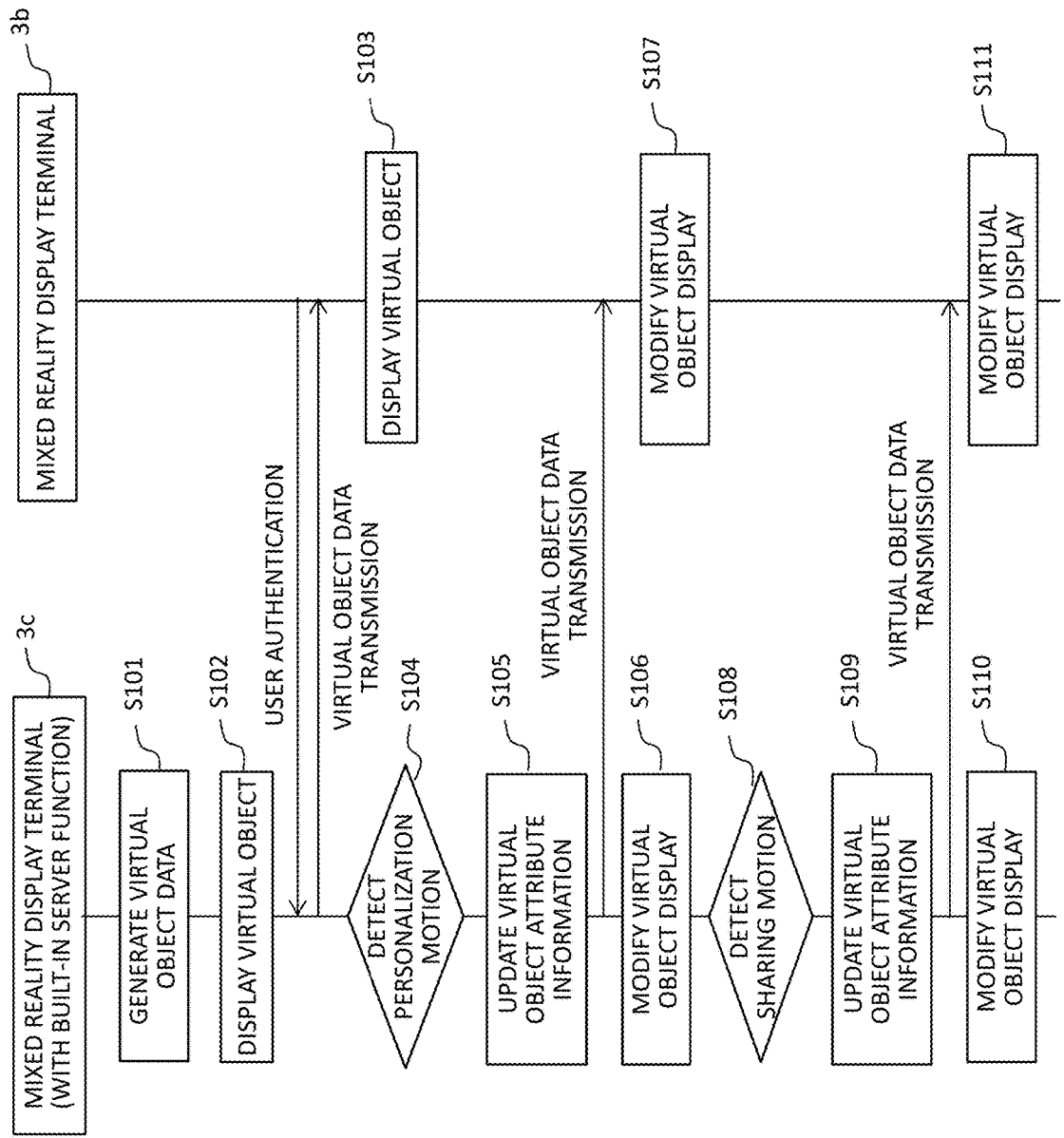

MIXED REALITY DISPLAY SYSTEM AND MIXED REALITY DISPLAY TERMINAL

TECHNICAL FIELD

The present invention relates to a mixed reality display system and a mixed reality display terminal which are capable of generating and displaying a mixed reality space in which a virtually generated video, audio, or the like is combined with a video, audio, or the like of the real world and enabling a user to operate a virtually generated object in the mixed reality space.

BACKGROUND ART

As a background art in this technical field, a system that displays a shared virtual object and a personal virtual object in a mixed reality environment is disclosed in Patent Document 1. A plurality of users can perform a cooperative interaction on the shared virtual object, and the personal virtual object is visible to a single user. Further, it is described that it is possible to facilitate a cooperative interaction on the shared virtual object by a plurality of persons as the personal virtual object is provided.

CITATION LIST

Patent Document

Patent Document 1: JP 2016-525741 W

SUMMARY OF THE INVENTION

Problems to be Solved by the Invention

Specific usages of the shared virtual objects and the personal virtual objects are as follows.

A first example is a case in which a model of a prototype product or the like is displayed as the shared virtual object in the mixed reality space, and a design of the model is examined. As the virtual object is shared with a plurality of designers, discussions by a plurality of designers can be performed smoothly. On the other hand, for the shared virtual objects, an authority to change the design is given to all the designers, and thus it is not suitable for a case in which individual designers desire to examine modifications individually. In such a case, it is convenient if it is possible to switch it to the private virtual object for which a specific designer has a modification authority. To do this smoothly, it is desirable to be able to perform an operation of copying the displayed shared virtual object as the private virtual object for a specific user and an operation of merging the private virtual object for a specific user with the shared virtual object conversely.

A second example is a case in which an advertisement is displayed as the shared virtual object as in a virtual advertising catalog place. In this case, an experience as if advertisements are displayed in the same place is provided to a plurality of users in the mixed reality space. At this time, there occurs a request that a certain user desires to copy the advertisement as a personal one as can be inferred from a user action in an actual advertising catalog space. Even in such a case, it is desirable to be able to switch the shared virtual object to the private virtual object for the user. That is, the operation of switching the shared virtual object and the private virtual object (which here means a copy operation and a merge operation) is necessary.

However, in the invention disclosed in Patent Document 1, switching the shared state (the shared virtual object) and the private state (the private virtual object) alternately for a certain virtual object as described above is not taken into consideration. Further, even when switching between the shared virtual object and the private virtual object is performed, there are following problems in order to do this smoothly.

(1) It is necessary for each user to remember whether the virtual object is the shared virtual object or the private virtual object and use them differently, and users who do not remember them are likely to be confused.

(2) If the private virtual object is displayed only to a specific user A and is invisible to other user B (for example, in the case of Patent Document 1), the operation on the invisible private virtual object is not recognized by the other user B, and thus the user B feels confused since the user B does not know an operation performed by the user A.

(3) A simple means that enables the user to easily perform switching between the shared virtual object and the private virtual object (the copy operations and the merge operations) is necessary.

(4) In a case in which the user A is operating the shared virtual object using the private virtual object, operation content may be hidden by the hand of the user A and may be invisible to the other user B.

It is an object of the present invention to provide a mixed reality display system and a mixed reality display terminal which are capable of enabling the user to smoothly perform switching between the shared virtual object and the private virtual object in the mixed reality space without confusion.

Solutions to Problems

The present invention provides a mixed reality display system including a server and a plurality of mixed reality display terminals used by a plurality of users, in which the server and the plurality of mixed reality display terminals are connected via a network, virtual objects are displayed in a real space in a mixed manner, and the virtual objects include a shared virtual object for which a plurality of mixed reality display terminals have an operation authority and a private virtual object for which only a specific mixed reality display terminal has an operation authority. The server has virtual object attribute information for displaying the virtual objects in the plurality of mixed reality display terminals, and each of the plurality of mixed reality display terminals includes a motion detecting unit that detects a motion of each of the users for switching between the shared virtual object and the private virtual object. When a detection result by the motion detecting unit is received from the mixed reality display terminal, the server updates the virtual object attribute information depending on whether the virtual object is the shared virtual object or the private virtual object, and transmits data of the virtual object after the update to the plurality of mixed reality display terminals.

Effects of the Invention

According to the present invention, the user can smoothly perform switching between the shared virtual object and the private virtual object in the mixed reality space without confusion.

BRIEF DESCRIPTION OF THE DRAWINGS

FIG. 1A is a block diagram illustrating an overall configuration of a mixed reality display system according to a first embodiment.

FIG. 4A is a data table illustrating an example of virtual object attribute information 239.

FIG. 4B is a data table illustrating an example of user authentication information 240.

FIG. 4C is a data table illustrating an example of device management information 241.

FIG. 6A is a diagram illustrating a virtual object personalization motion (a diagram viewed from a user who is operating).

FIG. 7A is a diagram illustrating a display state of a virtual object in a personalization motion (a diagram viewed from a user who is operating and a display pattern P1).

FIG. 7B is a diagram illustrating a display state of a virtual object in a personalization motion (a diagram viewed from user who is operating and a display pattern P2).

FIG. 7C is a diagram illustrating a display state of a virtual object in a personalization motion (a diagram viewed from another user and a display pattern P3).

FIG. 7D is a diagram illustrating a display state of a virtual object in a personalization motion (a diagram viewed from another user and a display pattern P4).

FIG. 8 is a diagram describing a difference in a display position of a private virtual object (display patterns P3 and P4).

FIG. 9A is a diagram illustrating a virtual object sharing motion (a diagram viewed from a user who is operating).

FIG. 9B is a diagram illustrating a virtual object sharing motion (a diagram viewed from another user).

FIG. 10A is a diagram illustrating a display state of a virtual object in a sharing motion (a diagram viewed from a user who is operating and a display pattern P1).

FIG. 10B is a diagram illustrating a display state of a virtual object in a sharing motion (a diagram viewed from another user and a display pattern P3).

FIG. 10C is a diagram illustrating a display state of a virtual object in a sharing motion (a diagram viewed from another user and a display pattern P4).

FIG. 12 is a block diagram illustrating an overall configuration of a mixed reality display system according to a second embodiment.

FIG. 14 is a diagram illustrating an operation sequence in the second embodiment.

MODE FOR CARRYING OUT THE INVENTION

Hereinafter, exemplary embodiments of the present invention will be described with reference to the appended drawings.

First Embodiment

FIG. 1A is a block diagram illustrating an overall configuration of a mixed reality display system according to a first embodiment. A mixed reality display system 10 of the present embodiment is configured such that a server 1 and a plurality of mixed reality display terminals 3a and 3b for users are connected to a network 2. Here, there are two mixed reality display terminals, but of course, the number of mixed reality display terminals may be two or more. As the mixed reality display terminal, for example, there is a head mount display (HMD) worn on the user's head. Hereinafter, the mixed reality display terminal is referred to simply as a "terminal."

The server 1 has a function of holding attribute information of virtual objects, a function of performing device authentication, and a function of performing user authentication. The server 1 further includes a communication I/F and has a function of communicating with the mixed reality display terminals (terminals) 3a and 3b via the network 2. The server has a video/audio output function and has a function of outputting/receiving the attribute information of the virtual object held by the server to/from the terminals 3a and 3b and can modify programs and functions inside the server.

On the other hand, each of the mixed reality display terminals (terminals) 3a and 3b has a communication I/F, and receives user authentication from the server 1 via the network 2 and further receives data of the virtual object and the user authentication information held in the server 1. Each of the terminals 3a and 3b has a video output unit and an audio output unit, and has a function of outputting and displaying a video and audio of the virtual object on the basis of the data of the virtual object received from the server 1 and further modifying them.

At this time, each of the terminals 3a and 3b has a function of appropriately adjusting and outputting the video and audio so that the user has perception as if a virtual object or a virtual sound exists at a specific position in a real space when the user perceives the output video and audio. To this end, each of the terminals 3a and 3b has a means for detecting a position or acceleration information and has a function of dynamically generating a video and audio using the position/acceleration information.

Figure 1B:
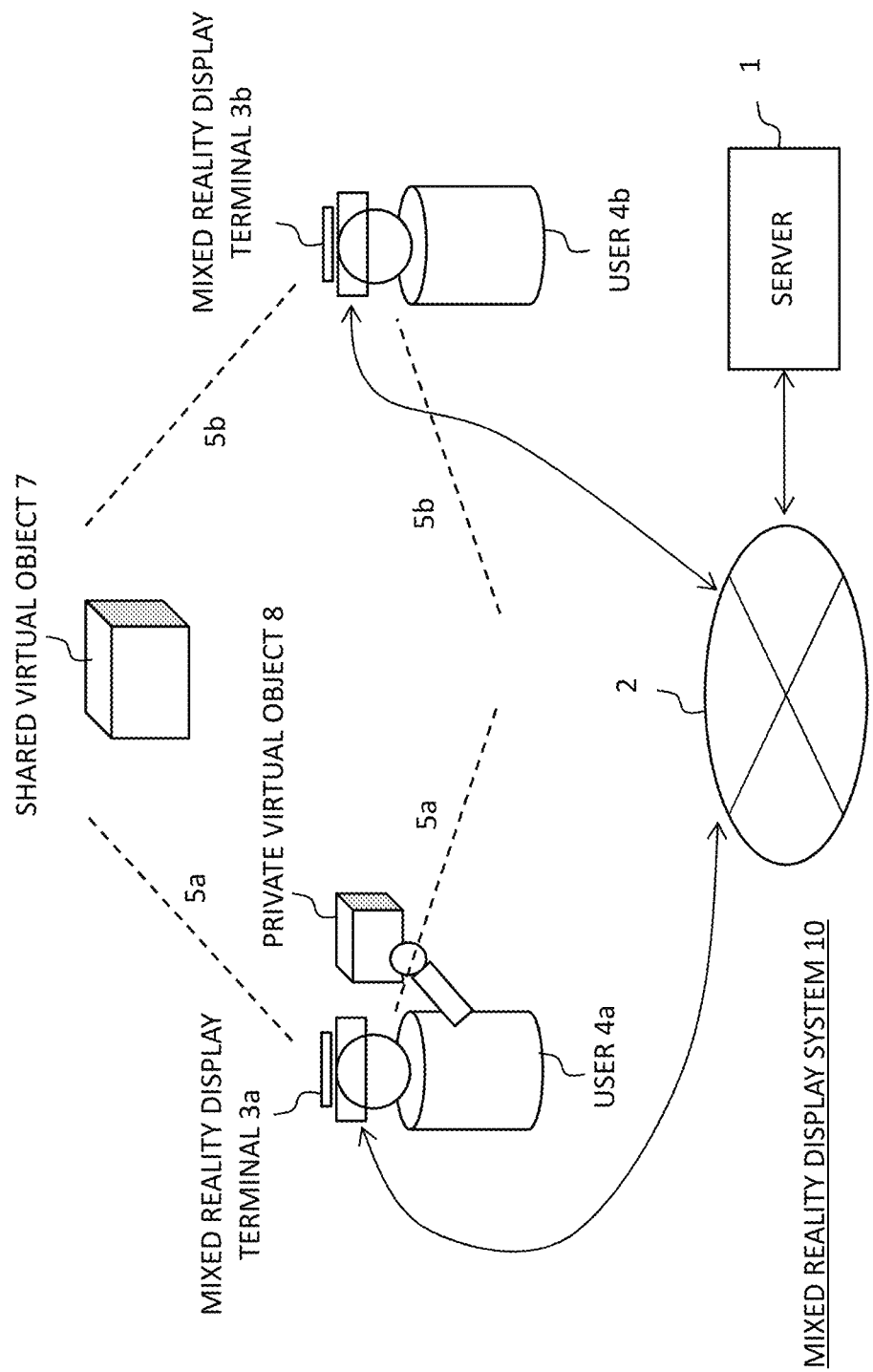
FIG. 1B is a diagram illustrating an example of a mixed reality space in which a shared virtual object and a private virtual object are mixed.

FIG. 1B is a diagram illustrating an example of a mixed reality space in which the shared virtual object and the private virtual object provided by the mixed reality display system 10 of FIG. 1 are mixed. Here, two users 4a and 4b wear the terminals (HMD) 3a and 3b on their heads, respectively, and operate the virtual object in the mixed reality space. A shared virtual object 7 and a private virtual object 8 appear in a field of view 5a of the user 4a through the terminal 3a. The shared virtual object 7 and the private virtual object 8 also appear in a field of view 5b of the user 4b through the terminal 3b. Further, the user 4a is performing a certain operation on the private virtual object 8.

Next, internal configurations of the mixed reality display terminals 3a, 3b and the server 1 will be described.

[Internal Configuration of Mixed Reality Display Terminal]

Figure 2A:
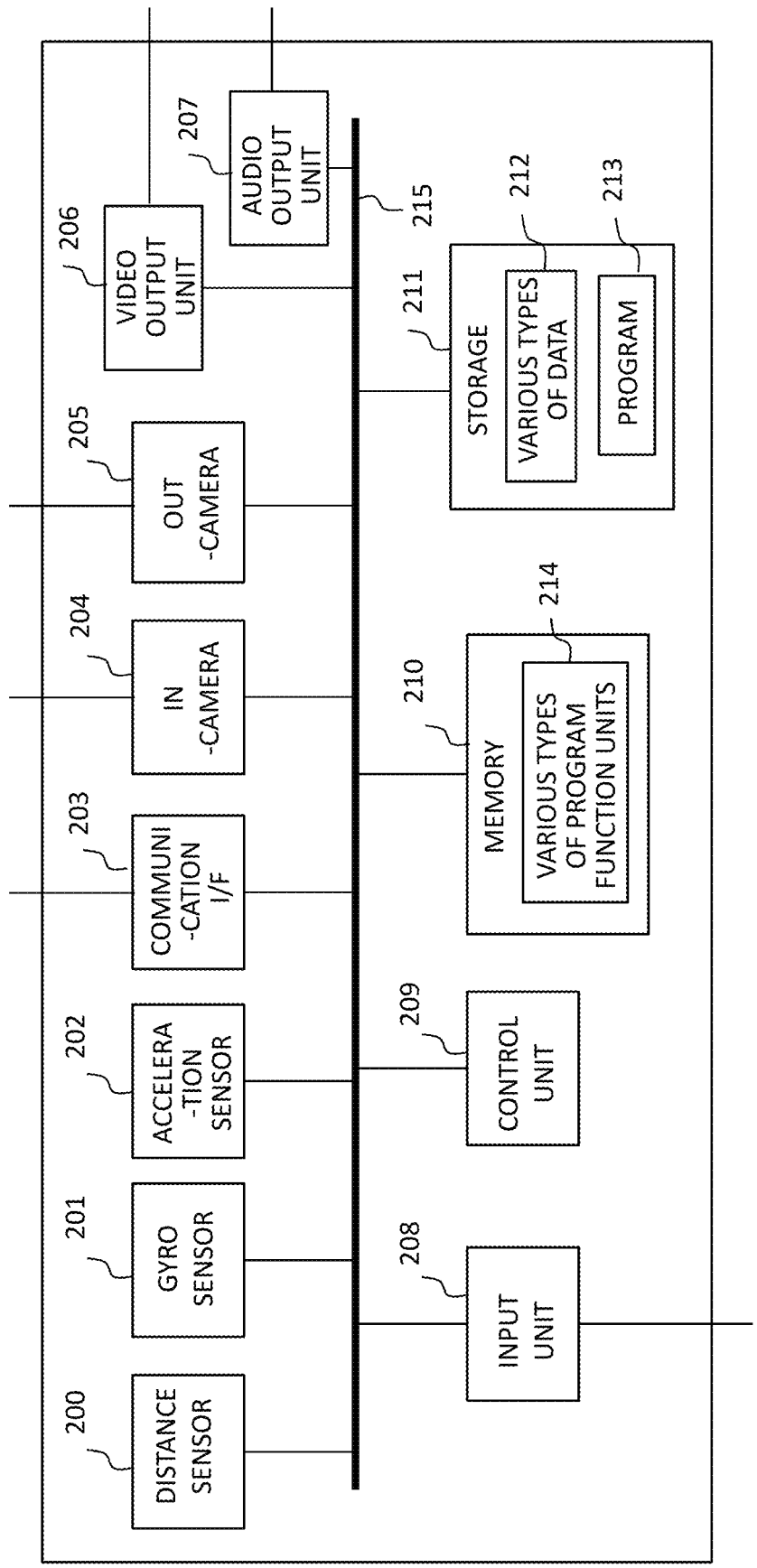
FIG. 2A is a diagram illustrating a hardware configuration of mixed reality display terminals 3a and 3b.

FIG. 2A is a diagram illustrating a hardware configuration of the mixed reality display terminals 3a and 3b. Here, the terminal 3a and the terminal 3b are described as having the same configuration, but they need not necessarily have the same configuration.

A distance sensor 200 detects a motion of a hand of the user or a distance to an object in the real space. A gyro sensor 201 and an acceleration sensor 202 accurately measure a position and acceleration of the terminal. A communication I/F 203 communicates with the server 1 via the network 2. Further, an in-camera 204 detects a line of sight direction of the user, and an out-camera 205 photographs the real space.

A control unit 209 reads various types of data 212 and a program 213 held in a storage 211 through the various types of program function units 214 installed in a memory 210, integrates various types of sensors or camera videos, and generates a video and audio of the virtual object. Then, the control unit 209 adjusts the video and audio of the virtual object so that they exist at a specific position in a specific direction in the real space.

The generated video and audio of the virtual object are output and displayed from a video output unit 206 and an audio output unit 207. An input unit 208 receives an operation input by touch or voice. The respective blocks are connected by a bus 215.

As a result, the user who watched the video of the terminal 3a or 3b or heard the audio can get the perception as if a virtual object or a virtual sound exists at a specific position in the real space. Further, for a technique (mixed reality (MR)) of generating the video and audio of the virtual object so that they exist at a specific position in a specific direction in the real space, many related arts have been announced, and an example thereof is disclosed in Patent Document 1.

Figure 2B:
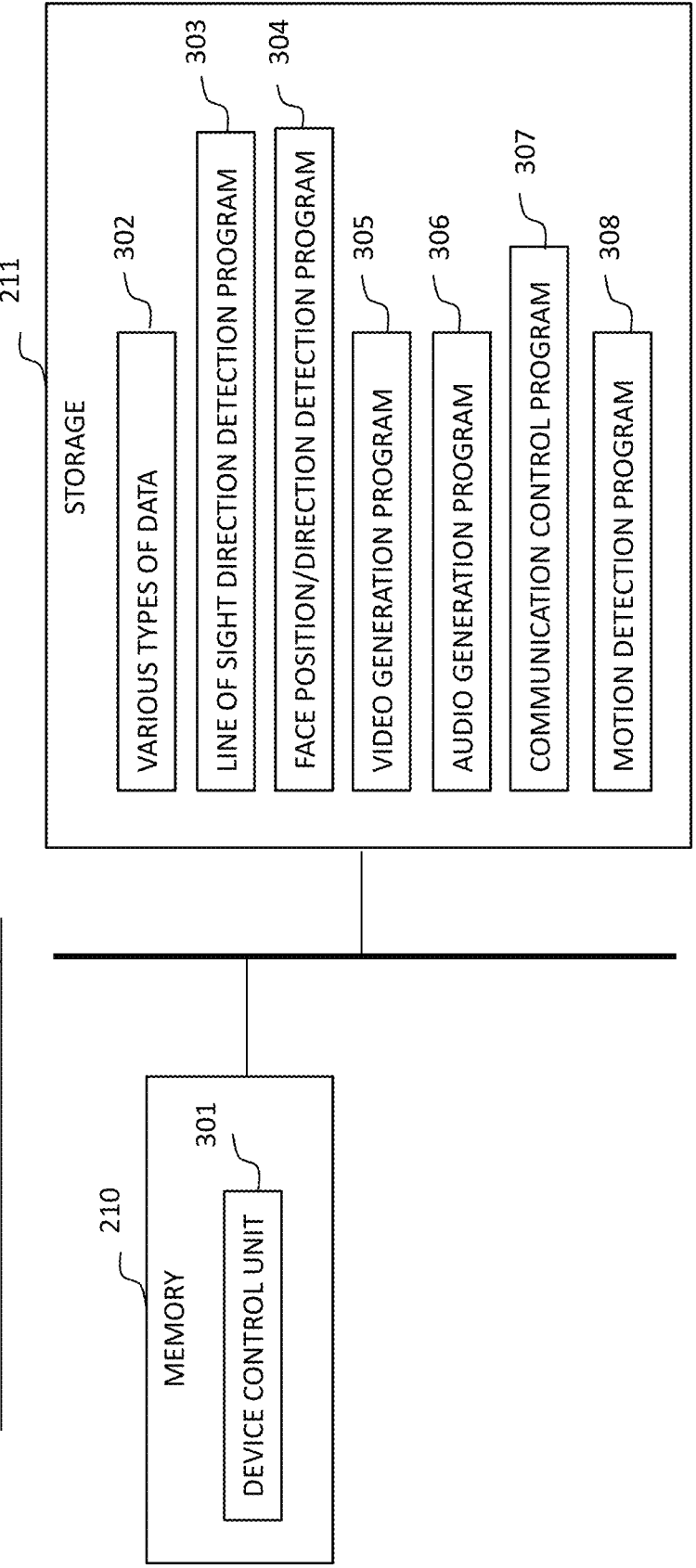
FIG. 2B is a diagram illustrating a software configuration of mixed reality display terminals 3a and 3b.

FIG. 2B is a diagram illustrating a software configuration of the mixed reality display terminals 3a and 3b. Here, configurations of the memory 210 and the storage 211 in FIG. 2A are illustrated.

The storage 211 stores various types of data 302, a line of sight direction detection program 303, a face position/direction detection program 304, a video generation program 305, an audio generation program 306, and a communication control program 307. These data and program are called to the memory by a device control unit 301 installed in the memory 210, and realize various types of functions. These data and program may be stored in the memory 210 in advance.

In the following description, for the sake of simplicity, various functions realized by executing the respective programs through the device control unit 301 will be described as being realized by various types of program function units.

The line of sight direction detection program 303 detects the line of sight direction of the user on the basis of image information obtained from the in-camera 204. Hereinafter, the line of sight direction detection program 303 and the in-camera 204 are also referred to as a "line of sight detecting unit."

A motion detection program 308 detects a motion performed by the user in the real space on the basis of information obtained from the distance sensor 200, the out-camera 205, or the like. Here, examples of the motion include a motion of moving a hand from a specific position to a specific position, a motion of closing a hand, and a motion of opening a hand. For the method of detecting the motion of the user from distance sensor information or camera information, many methods have been known from the past, and an example thereof is disclosed in Reference 1.

REFERENCE 1

Zhou Ren, et al. "Robust hand gesture recognition with kinect sensor." Proceedings of the 19th ACM international conference on Multimedia. ACM, 2011.

Further, the motion detection program 308 may have a function for detecting a "voice motion" from a volume of a voice or speech content input to the input unit 208. A speech recognition technique can be used as a method for detecting speech content from a voice. For the speech recognition technique, many methods have been known from the past, and an example thereof is disclosed in Reference 2.

REFERENCE 2

Lawrence R. Rabiner and Biing-Hwang Juang. "Fundamentals of speech recognition." (1993).

Hereinafter, the distance sensor 200, the out-camera 205, the input unit 208, and the motion detection program 308 are also referred to as a "motion detecting unit."

The face position/direction detection program 304 detects a position and direction of a face of the user in the space on the basis of signals from the gyro sensor 201 and the acceleration sensor 202. The information is used when the virtual object and the virtual sound are generated in the video generation program 305 and the audio generation program 306.

The video generation program 305 generates a video to be output from the video output unit 206 in accordance with information of the position or direction of the face obtained by the face position/direction detection program 304 and the image obtained from the in-camera 204. This video is adjusted so that the user perceives it as if a virtual object exists at a specific position in the real space.

The audio generation program 306 generates an audio to be output from the audio output unit 207 in accordance with information of the position or direction of the face obtained by the face position/direction detection program 304 and the image obtained from the in-camera 204. The audio is adjusted so that the user perceives it as if a virtual object exists at a specific position in the real space.

The communication control program 307 communicates with the server 1 through the communication I/F 203. Here, examples of communicated content include the attribute information (data) of the virtual object and the user authentication information, but other information may be included.

[Internal Configuration of Server]

Figure 3A:
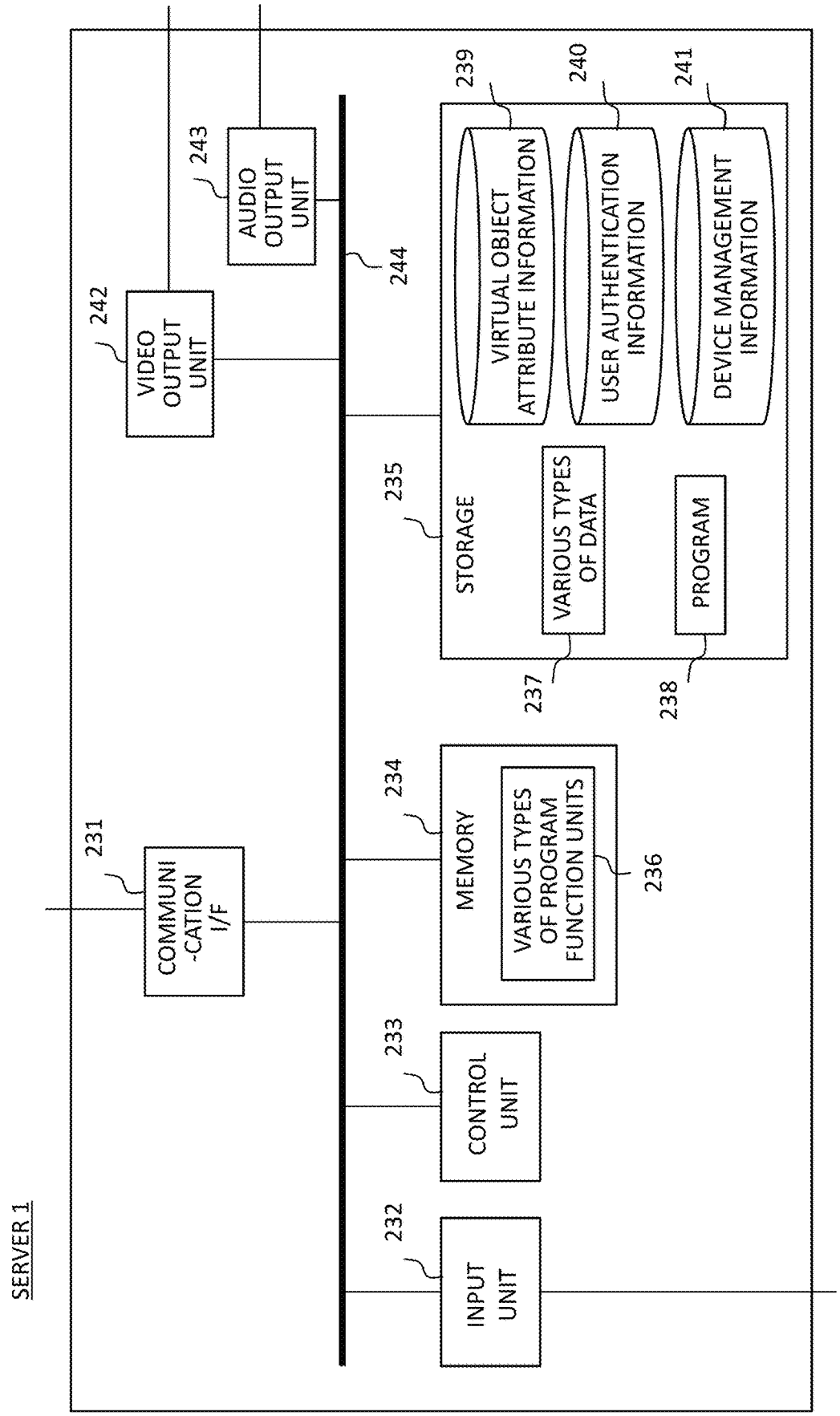
FIG. 3A is a diagram illustrating a hardware configuration of a server 1.

FIG. 3A illustrates a hardware configuration of the server 1.

A storage 235 stores various types of data 237 for operating the server, a program 238, and virtual object attribute information 239, user authentication information 240, and device management information 241 which are used for controlling the terminals 3a and 3b. The data and a program group are read out to a memory via various types of program function units 236 installed in a memory 234 and executed by a control unit 233.

A communication I/F 231 communicates with the terminals 3a and 3b via the network 2. Here, examples of communicated content include data of the virtual object attribute information 239 or the user authentication information 240, but other data may be included.

An input unit 232 can receive an operation input of the user and also modify the internal data of the server 1 in accordance with a user input. A video output unit 242 and an audio output unit 243 display the internal data of the server 1 (the virtual object attribute information 239 or the like) for the user. The respective blocks are connected by a bus 244.

[Software Configuration of Server]

Figure 3B:
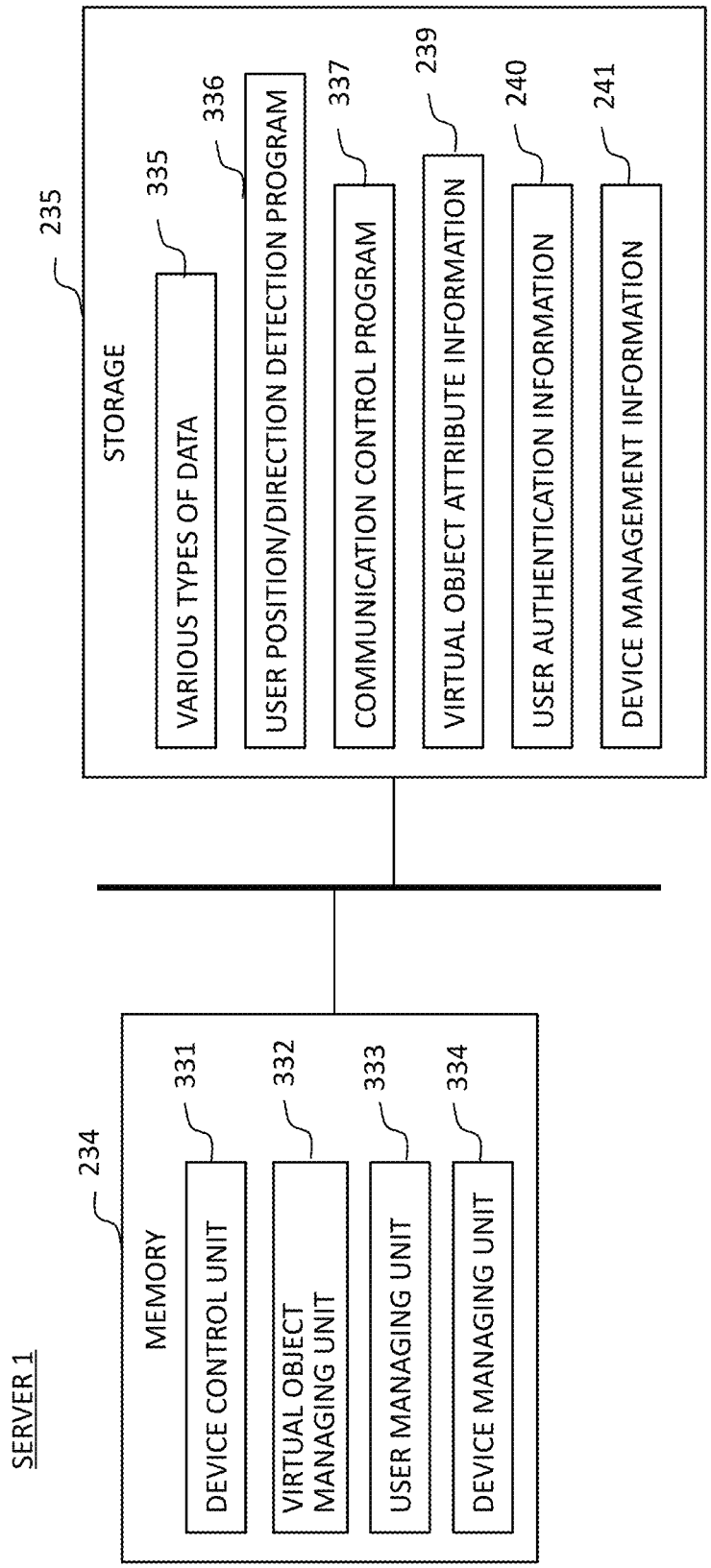
FIG. 3B is a diagram illustrating a software configuration of a server 1.

FIG. 3B illustrates a software configuration of the server 1. Here, configurations of the memory 234 and the storage 235 in FIG. 3A are illustrated.

The storage 235 stores various types of data 335, a user position/direction detection program 336, a communication control program 337, the virtual object attribute information 239, the user authentication information 240, and the device management information 241. Further, the memory 234 stores a device control unit 331, a virtual object managing unit 332, a user managing unit 333, and a device managing unit 334.

The virtual object managing unit 332 manages a position, a direction, and a shape of the virtual object and an operation authority of the user in the mixed reality space on the basis of the virtual object attribute information 239 stored in the storage 235. The virtual object managing unit 332 modifies the virtual object attribute information 239 on the basis of the information from each of the terminals 3a and 3b obtained by the communication I/F 231. The virtual object managing unit 332 can also modify the virtual object attribute information 239 on the basis of the operation of the user from the input unit 232. Further, the virtual object managing unit 332 can cause information described in the virtual object attribute information 239 to be displayed for the user from the video output unit 242 or the audio output unit 243.

The user managing unit 333 manages the user authentication information 240 for authenticating each user and the device management information 241 for authenticating a terminal owned by the user. These pieces of information 240 and 241 are stored in the storage 235. The user managing unit 333 acquires the user authentication information such as a user name and a password from the user input in each of the terminals 3a and 3b (the input unit 208) through the communication I/F 231 and checks whether or not it is a legitimate registered user. If the user authentication information is not correct, error information is transmitted. Further, the user name and the password may be stored in the storage 211 of each of the terminals 3a and 3b in advance, and the authentication can be performed although the user does not input them each time.

The device managing unit 334 transmits information necessary for communication with the terminals 3a and 3b to the communication control program 337 in accordance with the device management information 241 stored in the storage 235.

Each piece of data or program stored in the storage 235 is read out to the memory 234 and executed in accordance with the control of the device control unit 331 stored in the memory 234. Each piece of data or program stored in the storage 235 may be stored in the memory 234 in advance.

In the following description, for the sake of simplicity, various functions realized by executing each program through the device control unit 331 will be described as being realized by various types of program function units.

The user position/direction detection program 336 detects the position and direction of each of the terminals 3a and 3b on the basis of the information obtained from each of the terminals 3a and 3b through the communication I/F 231. These pieces of information may be transmitted to each of the terminals 3a and 3b.

The communication control program 337 controls communication with the terminals 3a and 3b. Here, examples of communicated content include the virtual object attribute information 239 and the user authentication information 240, but other information may be included.

[Data Format]

Data formats of various types of information stored on the server 1 are described below.

FIG. 4A is a data table illustrating an example of the virtual object attribute information 239 managed by the virtual object managing unit 332 of the server 1. A virtual object ID 401, a virtual object name 402, a virtual object direction 403, a virtual object position 404, a virtual object color/shape 405, a copy source 406 and a copy destination 407 indicating a copy relation between the virtual objects, and an operation authority 408 of the user are described in the virtual object attribute information 239. A shared/private field 409 is for explanation.

The virtual object name 402, the virtual object direction 403, the virtual object position 404, and the virtual object color/shape 405 are data for displaying the virtual object in the terminals 3a and 3b. Further, in this example, a virtual object ID=2, 3 is a "shared" virtual object for which all the users or a specific group has the operation authority 408. A virtual object ID=1, 4 is a "private" virtual object for which a specific user 1 has the operation authority 408. Further, the private virtual object ID=4 indicates a copy from the shared virtual object ID=3.

FIG. 4B is a data table illustrating an example of the user authentication information 240 managed by the user managing unit 333 of the server 1. A user ID (management number) 411, a user password 412, and the like are described in the user authentication information 240. Further, a user name, a full name, an address, and contact information may be described. In addition to the user authentication using the user password 412, general biometric authentication such as a finger vein, a fingerprint, a voice, a facial image, and an iris may be used, and in this case, the item of the user authentication information 240 is changed appropriately.

FIG. 4C is a data table illustrating an example of the device management information 241 managed by the device managing unit 334 of the server 1. A device ID (management number) 421, a device name 422, a device password 423, a device IP address 424, and the like of each terminal are described in the device management information 241.

[Operation Sequence]

Figure 5:
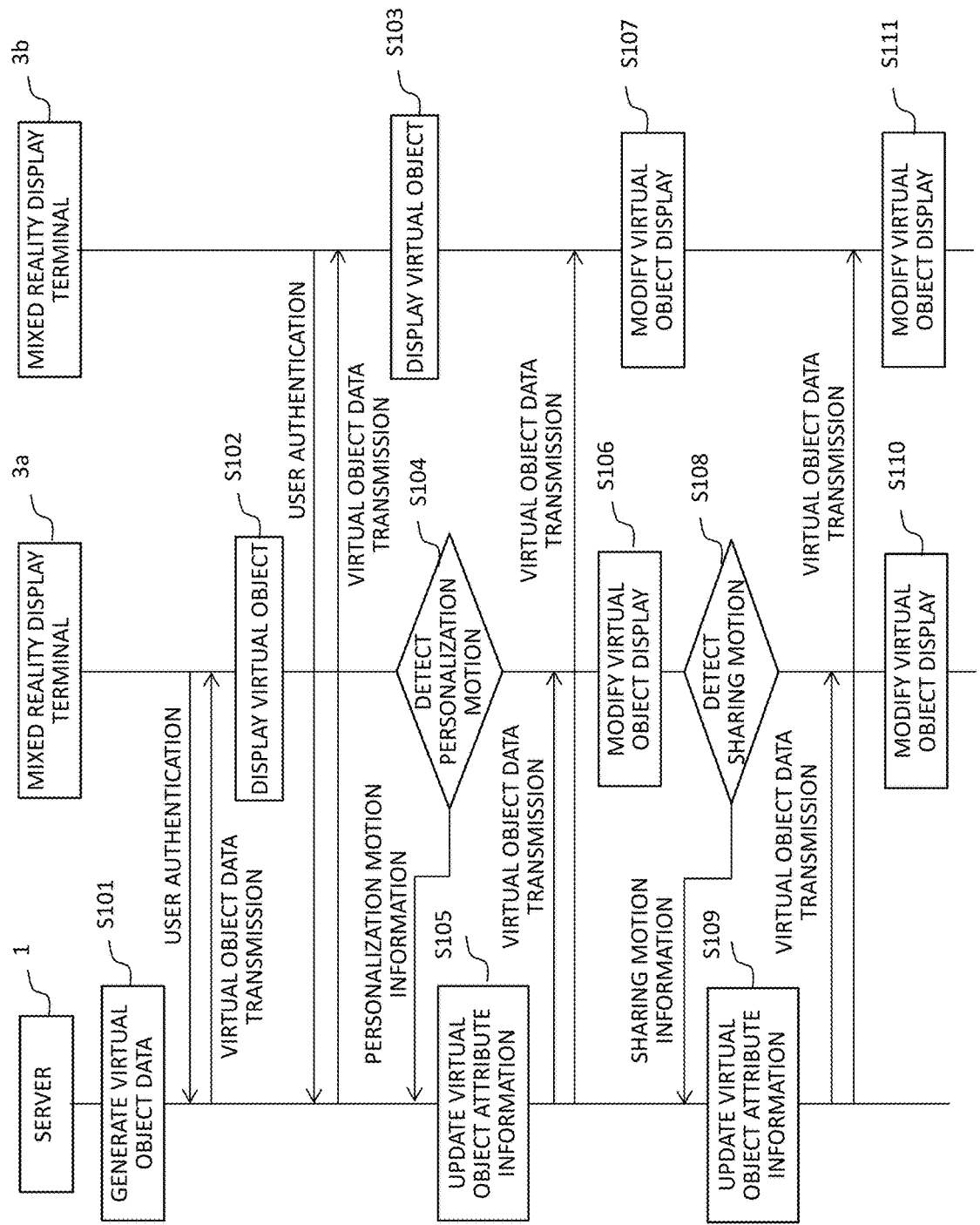
FIG. 5 is a diagram illustrating an operation sequence in the first embodiment.

FIG. 5 is a diagram illustrating an operation sequence in the first embodiment. Here, communication between the server 1 and the terminal 3a (the user 4a) and the terminal 3b (the user 4b) when performing "personalization motion" and "sharing motion" for the virtual object will be described. Here, the personalization motion is a motion of generating the private virtual object by copying the shared virtual object and performing switching to a virtual object for which only a specific user has the operation authority. On the other hand, the "sharing motion" is a motion of merging the private virtual object with the shared virtual object and performing switching to a new shared virtual object for which each user has the operation authority.

If the server 1, the mixed reality display terminal 3a, and the mixed reality display terminal 3b are activated, virtual object data according to the virtual object attribute information 239 is generated in the server 1 (sequence S101). If the user authentication information (or the device management information) is transmitted from the terminal 3a (the user 4a) to the server 1, it is compared with the user authentication information 240 (or the device management information 241) in the server 1. If the authentication is successful, the virtual object data is transmitted to the terminal 3a. The terminal 3a generates the video and audio of the virtual object are through the video generation program 305 and the audio generation program 306 on the basis of the received virtual object data, and output and displayed the video and audio from the video output unit 206 and the audio output unit 207 (sequence S102).

On the other hand, the user authentication is similarly performed on the terminal 3b (the user 4b), and if the authentication is successful, the video and audio of the virtual object are also output and displayed in the terminal 3b (sequence S103). Here, the displayed virtual object is the shared virtual object for which both the user 4a and the user 4b have the operation authority.

Then, if the user 4a performs, for example, an action of pulling the virtual object closer to the user in a state in which the virtual object is displayed, for example, the motion detecting unit (the sensor such as the out-camera 205 and the motion detection program 308) of the terminal 3a detects the action as the personalization motion (sequence S104). Then, the terminal 3a gives a notification indicating that the personalization motion is detected to the server 1. The server updates the virtual object attribute information 239 in accordance with the personalization motion, and copies the shared virtual object to generate data of a new private virtual object (sequence S105). Here, the operation authority for the generated private virtual object is given only to the user 4a (the terminal 3a).

The data of the new private virtual object is transmitted to the terminal 3a and the terminal 3b, and each of the terminals 3a and 3b modifies the display state of the currently displayed virtual object on the basis of the received virtual object data (sequences S106 and S107). As will be described later, the terminal 3a and the terminal 3b are different in the display state of the virtual object, which are managed in accordance with the virtual object attribute information 239 of the server 1.

Further, if the user 4a performs an action of bringing the private virtual object closer to the shared virtual object in a state in which the virtual object is displayed, the motion detection unit of the terminal 3a detects the motion as the sharing motion (sequence S108). Then, the terminal 3a gives a notification indicating that the sharing motion is detected to the server 1. The server 1 updates the virtual object attribute information 239 in accordance with the sharing motion, and merges the private virtual object with the shared virtual object to generate data of a new shared virtual object (sequence S109). Here, the operation authority for the generated shared virtual object is given to both the user 4a and the user 4b.

The data of the new shared virtual object is transmitted to the terminal 3a and the terminal 3b, and each of the terminals 3a and 3b modifies the display state of the currently displayed virtual object on the basis of the received virtual object data (sequences S110 and S111).

[Personalization of Shared Virtual Object]

Next, the behavior when the personalization motion (S104 in FIG. 5) is performed will be described with reference to FIGS. 6, 7, and 8.

Figure 6B:
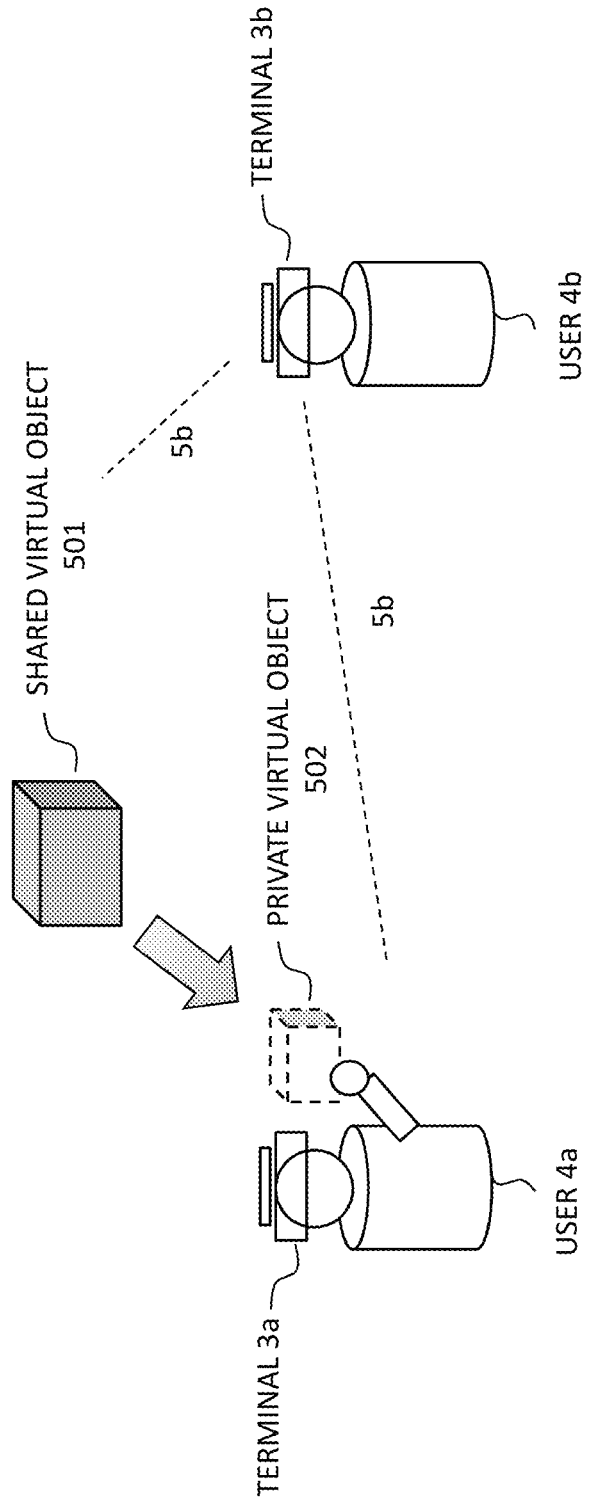
FIG. 6B is a diagram illustrating a virtual object personalization motion (a diagram viewed from another user).

FIGS. 6A and 6B are diagrams illustrating a personalization motion for switching a shared virtual object 501 to a private virtual object 502 in the mixed reality space. Here, an example in which the user 4a copies the private virtual object 502 from the shared virtual object 501 by performing the personalization motion on the shared virtual object 501 is illustrated. The personalization motion in the present embodiment is a motion of generating the private virtual object 502 for which only the user 4a has the operation authority while leaving the shared virtual object 501 as it is.

For example, when the user performs the following specific operations, the motion detecting unit (the distance sensor 200, the out-camera 205, and the input unit 208) of each of the mixed reality display terminals 3a and 3b determines them as the personalization motion:

A motion of pulling the shared virtual object closer while forming a specific shape with fingers is performed. As an example, a motion of pulling the shared virtual object closer in a state in which the index finger and the thumb are connected to each other is performed.

A motion of pulling the shared virtual object closer after performing a specific hand gesture is performed. As an example, a motion of pulling the shared virtual object closer after moving the hand around the circumference of the shared virtual object is performed.

A motion of pulling the shared virtual object after speaking "copy" is performed.

A motion of speaking "copy" after pulling the shared virtual object closer is performed.

A motion of speaking "copy" during a motion of pulling the shared virtual object closer.

A mechanism in which the user can register a specific motion when performing the personalization motion may be prepared. Further, information indicating whether or not the shared virtual object 501 is copied to the private virtual object 502 by the above motion (whether or not copying is permitted) may be described in the virtual object attribute information 239. Then, it may be controlled whether or not the virtual object is personalized in accordance with the copy permission information.

FIG. 6A illustrates a mixed reality space 5a which the user 4a who is performing the personalization operation can see through the terminal 3a. On the other hand, FIG. 6B illustrates a mixed reality space 5b which the other user 4b can see through the terminal 3b. As illustrated in FIGS. 6A and 6B, the shared virtual object 501 and the private virtual object 502 copied therefrom can be seen by all of the users 4a and 4b, but they look different to the user 4a and the user 4b (for example, a color, a shape, a distance, a voice, or the like). Accordingly, the users 4a and 4b can easily identify the shared virtual object 501 and the private virtual object 502. Specific display states when transition from the shared virtual object 501 to the private virtual object 502 is performed will be described below with reference to FIGS. 7A to 7D.

FIGS. 7A and 7B illustrate the display state of the virtual object viewed from the user 4a who is performing an operation when transition from the shared virtual object 501 to the private virtual object 502 is performed. Here, a virtual sound 503 is output from the shared virtual object 501. In FIGS. 7A and 7B, the display state transitions in the order of timings (1), (2), and (3). Arrows in FIGS. 7A and 7B indicate a motion of the hands of the user (a white arrow) and movement of the display position of the virtual object (a gray arrow).

FIG. 7A illustrates a case according to a<display pattern P1>. In this case, the display position of the shared virtual object 501 is fixed to an original position during personalization transition. At the timing (1), the user 4a puts the hands on the shared virtual object 501. At the timing (2), if the user 4a performs an action of pulling the shared virtual object 501 closer to the user 4a, the motion detecting unit of the terminal 3a determines the action as the personalization motion and transmits it to the server 1. The server 1 copies the shared virtual object 501 to generate a new private virtual object 502 and transmits it to the terminal 3a. The terminal 3a displays the private virtual object 502, but the display position thereof is adjusted in accordance with the position of the hand detected by the motion detecting unit. Finally, at the timing (3), the private virtual object 502 is displayed so as to be drawn to the user 4a.

In the process from the timings (1) to (3), the color of the shared virtual object 501 gradually fades, and the volume of the virtual sound 503 decreases. On the other hand, the newly generated private virtual object 502 is adjusted so that the color gradually increases, and the volume of the virtual sound 503 also increases. Accordingly, the user 4a can easily switch the shared virtual object 501 to the private virtual object 502 and easily identify the shared virtual object 501 and the private virtual object 502 generated therefrom.

FIG. 7B illustrates a case according to a <display pattern P2>. In this case, the display position of the shared virtual object 501 is moved in accordance with the position of the hand of the user 4a and the distance of the shared virtual object 501. A difference with the <display pattern P1> of FIG. 7A will be described.

At a timing (2), if the user 4a performs the personalization motion, the terminal 3a displays the private virtual object 502 generated by the server 1 in accordance with the position of the hand of the user 4a. At this time, the shared virtual object 501 is moved to a position between the original position of the shared virtual object 501 and the position of the hand and displayed (that is, moved from the original position to the position of the hand).

At a timing (3), if the position of the hand is apart from the original position of the shared virtual object 501 by a certain distance or more, the shared virtual object 501 is returned to the original position and displayed. The private virtual object 502 is displayed as if it were pulled to the user 4a as in FIG. 7A.

FIGS. 7C and 7D illustrate the display state viewed from the other user 4b other than the user 4a who is performing an operation when transition from the shared virtual object 501 to the private virtual object 502 is performed. Timings (1), (2), and (3) in FIGS. 7C and 7D correspond to the timings (1), (2), and (3) in FIGS. 7A and 7B, respectively.

FIG. 7C illustrates a case according to a <display pattern P3>. In this case, the position of the generated private virtual object 502 visible to the other user 4b is the same as the position visible to the user 4a. In the mixed reality space 5b that is visible to the user 4b, the private virtual object 502 generated by the user 4a in timing (2) (3) is displayed semi-transparently, and virtual sound is not output. In timing (3), if the distance from the shared virtual object 501 to the private virtual object 502 is d3, it is equal to the position seen by the user 4a (distance d1 in FIG. 7A or FIG. 7B).

On the other hand, the shared virtual object 501 is normally displayed at the timings (1) and (2), but it is displayed, for example, in a darker color than a normal color, unlike the normal display, at the stage of the timing (3) after the private virtual object 502 is generated by the user 4a. Accordingly, the other user 4b can easily recognize that the private virtual object 502 is copied from the shared virtual object 501 without confusion.

Further, changing the color of the shared virtual object 501 at the timing (3) is just an example, and the present invention is not limited thereto. Further, various display states are possible, for example, a contour line may be displayed in red, blinking may be performed, a mark indicating a copy may be displayed, or luminance may be changed.

FIG. 7D illustrates a case according to a <display pattern P4>. In this case, the position of the generated private virtual object 502 visible to the other user 4b is different from the position visible to the user 4a. That is, at the timing (3), the private virtual object 502 generated by the user 4a is displayed at a position away from the position of the hand of the user 4a. At this time, the distance from the shared virtual object 501 to the private virtual object 502 is assumed to be d4. Accordingly, the user 4b has perception as if the private virtual object 502 were in the air.

FIG. 8 is a diagram illustrating a difference in the display position of the private virtual object 502 between FIG. 7C and FIG. 7D. A horizontal axis indicates the display position of the private virtual object 502 viewed from the user 4a who is performing an operation (the distance d1 from the shared virtual object 501), and a vertical axis indicates the display position of the private virtual object 502 viewed from the other user 4b (distances d3 and d4 from the shared virtual object 501).

In the <display pattern P3> of FIG. 7C, the display position (d3) of the private virtual object 502 viewed from the other user 4b is equal to the display position (d1) of the private virtual object 502 viewed from the user 4a who is performing an operation. On the other hand, in the <display pattern P4> of FIG. 7D, the display position (d3) of the private virtual object 502 viewed from the other user 4b is smaller than the display position (d1) of the private virtual object 502 viewed from the user 4a who is performing an operation.

According to the <display pattern P4> of FIG. 7D, at the timing (3) at which the user 4a generates the private virtual object 502, the user 4a perceives the private virtual object 502 which is closer to the user 4a as if it were in the air.

The advantage of the display method of the <display pattern P4> lies in that while the user 4a is operating the private virtual object 502 at a position close to the user 4a, the user 4b can observe the private virtual object 502 without being hidden by the hand of the user 4a. Further, it is possible to easily identify that the private virtual object 502 is copied from the shared virtual object 501 and generated without confusion.

In FIGS. 7C and 7D, in order to cause the other user 4b to surely recognize that the shared virtual object 501 is switched to the private virtual object 502, the following methods may be used.

There are cases in which the user 4b sees another direction at a time at which the user 4a performs the personalization motion. In this case, it is desirable to detect the line of sight direction of the user 4b through the line of sight detecting unit (the in-camera 204 and the line of sight detection program 303) installed in the terminal 3b of the user 4b and switch the display state (for example, the color) of the shared virtual object 501 at a timing at which the line of sight of the user 4b is placed on the shared virtual object 501. Accordingly, the user 4b does not overlook the personalization switching of the shared virtual object 501.

Further, when the position at which the user 4a performs the personalization motion is far from the position of the user 4b, it is desirable to detect the distance between the shared virtual object 501 and the terminal 3b through the distance sensor 200 and switch the display state (for example, the color) of the shared virtual object 501 at a timing at which the distance becomes a specified distance. Accordingly, the user 4b does not overlook the personalization switching of the shared virtual object 501.

Also, it is desirable to detect the speed or the acceleration at which the user 4b (the terminal 3b) approaches the shared virtual object 501 through the acceleration sensor 202 and switches the display state (for example, the color) when a predetermined speed or predetermined acceleration is exceeded. Accordingly, when the user 4b approaches the shared virtual object 501, the user 4b does not overlook that the virtual object is switched to the private virtual object.

[Sharing of Private Virtual Object]

Next, a behavior when the sharing motion detection is performed (S108 in FIG. 5) will be described with reference to FIGS. 9, 10, and 11.

FIG. 9A and FIG. 9B are diagrams illustrating a sharing motion for switching a private virtual object 601 to a shared virtual object 602 in the mixed reality space. Here, an example in which the user 4a merges the private virtual object 601 with the shared virtual object 602 by performing the sharing motion on the private virtual object 601 is illustrated. The sharing motion in the present embodiment is a motion of generating one new shared virtual object 602 from the private virtual object 601 and the shared virtual object 602, reflecting a feature of the private virtual object 601, and giving the operation authority even to the other user 4b by sharing.

For example, when the user performs the following specific motions, the motion detecting unit of each of the mixed reality display terminals 3a and 3b determines them as the sharing motion.

- A motion of bringing the private virtual object closer to the shared virtual object while forming a specific shape with fingers is performed. As an example, a motion of bringing the private virtual object closer to it with the index finger and the thumb are connected to each other is performed.
- A motion of bringing the private virtual object closer to the shared virtual object after performing a specific hand gesture is performed. As an example, a motion of bringing the private virtual object closer to the shared virtual object after moving the hand around the circumference of the private virtual object is performed.
- A motion of bringing the private virtual object closer to the shared virtual object after speaking "merge" is performed.
- A motion of speaking "merge" after bringing the private virtual object closer to the shared virtual object is performed.
- A motion of speaking "merge" during a motion of bringing the private virtual object closer to the shared virtual object is performed.
- A mechanism in which a user can register a specific motion when performing the sharing motion may be prepared.

FIG. 9A illustrates the mixed reality space 5a which the user 4a who is performing the sharing operation can see through the terminal 3a. On the other hand, FIG. 9B illustrates the mixed reality space 5b which the other user 4b can see through the terminal 3b. FIGS. 9A and 9B illustrate the operation of merging the two virtual objects by bringing the private virtual object 601 closer to the shared virtual object 602. Here, the private virtual object 601 and the shared virtual object 602 are displayed so that they look different to the user 4a and the user 4b (for example, a color, a shape, a distance, a voice, or the like). Accordingly, the users 4a and 4b can easily identify the private virtual object 601 and the shared virtual object 602. Specific display states when transition from the private virtual object 601 to the shared virtual object 602 is performed will be described below with reference to FIGS. 10A to 10C.

FIG. 10A illustrates a display state of the virtual object viewed from the user 4a who is performing an operation when transition from the private virtual object 601 to the shared virtual object 602 is performed. Here, a virtual sound 603 is output from the private virtual object 601. In FIG. 10A, the display state transitions in the order of timings (1), (2), and (3). Arrows in FIGS. 7A and 7B indicate a motion of the hands of the user (a white arrow) and movement of the display position of the virtual object (a gray arrow). This display pattern corresponds to the <display pattern 1> of FIG. 7A.

At a timing (1), the user 4a puts the hands on the private virtual object 601. At a timing (2), if the user 4a performs an action of bringing the private virtual object 601 closer to the shared virtual object 602, the motion detecting unit of the terminal 3a determines the action as the sharing motion and transmits it to the server 1. The server 1 merges the private virtual object 601 and the shared virtual object 602 which is its copy source to generate a new shared virtual object 602 and transmits it to the terminal 3a. At a timing (3), the terminal 3a displays the new shared virtual object 602 in the original display state (dark color).

In the process from the timings (1) to (3), the shared virtual object 602 gradually becomes darker, and the volume of the virtual sound 604 increases. On the other hand, the private virtual object 601 is adjusted so that the color gradually fades, and the volume of the virtual sound 603 is reduced. Accordingly, the user 4a can easily switch the private virtual object 601 to the shared virtual object 602.

FIGS. 10B and 10C illustrate a display state of the virtual object viewed from the other user 4b when transition from the private virtual object 601 to the shared virtual object 602 is performed. Timings (1), (2), and (3) in FIGS. 10B and 10C correspond to the timing (1), (2), and (3) in FIG. 10A, respectively.

FIG. 10B illustrates a case according to a <display pattern P3>. In this case, as described above with reference to FIG. 8, the position of the private virtual object 601 visible to the other user 4b is the same as the position visible to the user 4a.

At a timing (1), in the mixed reality space 5b that is visible to the user 4b, the private virtual object 601 of the user 4a is translucent, and the shared virtual object 602 is displayed in a dark color. That is, a distance d3 from the shared virtual object 602 to the private virtual object 601 is equal to the position (a distance d1 in FIG. 10A) viewed by the user 4a. If the user 4a performs a motion of bringing the private virtual object 601 closer to the shared virtual object 602 at a timing (2), both virtual objects are merged at a timing (3), and a new shared virtual object 602 is displayed in a normal color.

Accordingly, the user 4b can easily identify the private virtual object 601 and the shared virtual object 602 and easily recognize that the shared virtual object 602 is merged from the private virtual object 601 without confusion.

FIG. 10C illustrates a case according to a <display pattern P4>. In this case, as described in FIG. 8, the position of the private virtual object 601 visible to the other user 4b is different from the position visible to the user 4a. That is, at a timing (1), a distance d4 from the shared virtual object 602 to the private virtual object 601 is smaller than a position (the distance d1 in FIG. 10A) viewed by the user 4a. Accordingly, the user 4b has perception as if the private virtual object 601 were in the air. Therefore, the user 4b can observe the private virtual object 601 without being hidden by the hand of the user 4a.

Figure 11:
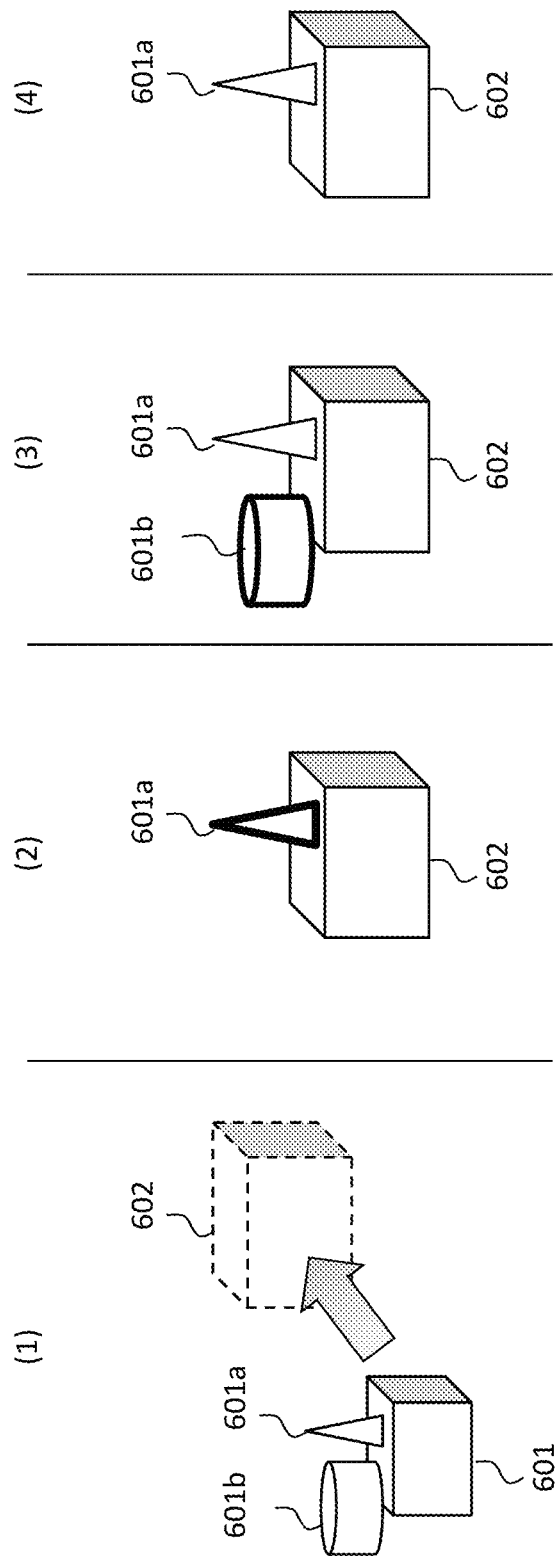
FIG. 11 is a diagram describing a virtual object shape decision in a sharing motion.

FIG. 11 is a diagram for describing a virtual object shape decision in the sharing motion. Commonly, a shape of the private virtual object 601 is different from a shape of the shared virtual object 602 which is merged with it. Therefore, when these virtual objects are merged, the user 4a can sequentially check whether or not a new virtual object is employed (combined) for parts which do not include each other in a difference between the shapes of the respective virtual objects.

At a timing (1), the private virtual object 601 is copied from the shared virtual object 602. After copying, a new private virtual object 601a and a private virtual object 601b are generated in accordance with an operation of the user 4a and combined with the private virtual object 601. Here, the operation of merging an aggregate of the private virtual objects 601, 601a, and 601b into the shared virtual object 602 of the copy source is performed.

At a timing (2), the user 4a selects whether or not the private virtual object 601, which is a first difference is combined with the shared virtual object 602. For this selection process, a method such as a hand gesture or speech recognition is used. For example, the user 4a is assumed to select to combine the private virtual object 601a with the shared virtual object 602. At a timing (3), the user 4a selects whether or not the private virtual object 601b which is a second difference is combined with the shared virtual object 602. Here, the user 4a rejects the combination of the private virtual object 601b. As a result, finally, as in a timing (4), a new set of shared virtual objects in which the private virtual object 601a is combined with the shared virtual object 602 is generated.

Further, in FIG. 11, a case in which the newly generated private virtual object is combined has been described, but even when the private virtual object itself is modified, an operation of selecting whether or not the private virtual object is merged into the shared virtual object can be performed in a similar procedure.

As described above, according to the first embodiment, in the mixed reality space, the switching between the shared virtual object and the private virtual object can be performed smoothly without confusion including not only the user who is performing an operation but also other users.

Second Embodiment

In a second embodiment, all the functions performed by the server 1 in the first embodiment are installed in the mixed reality display terminal. Therefore, the server 1 in the first embodiment is unnecessary. A difference from the first embodiment will be described below.

FIG. 12 is a block diagram illustrating an overall configuration of a mixed reality display system according to the second embodiment. A mixed reality display system 10' in the present embodiment includes a network 2 and a plurality of mixed reality display terminals 3c and 3b for the users. Among them, the mixed reality display terminal 3c is a terminal with a built-in server function.

Figure 13A:
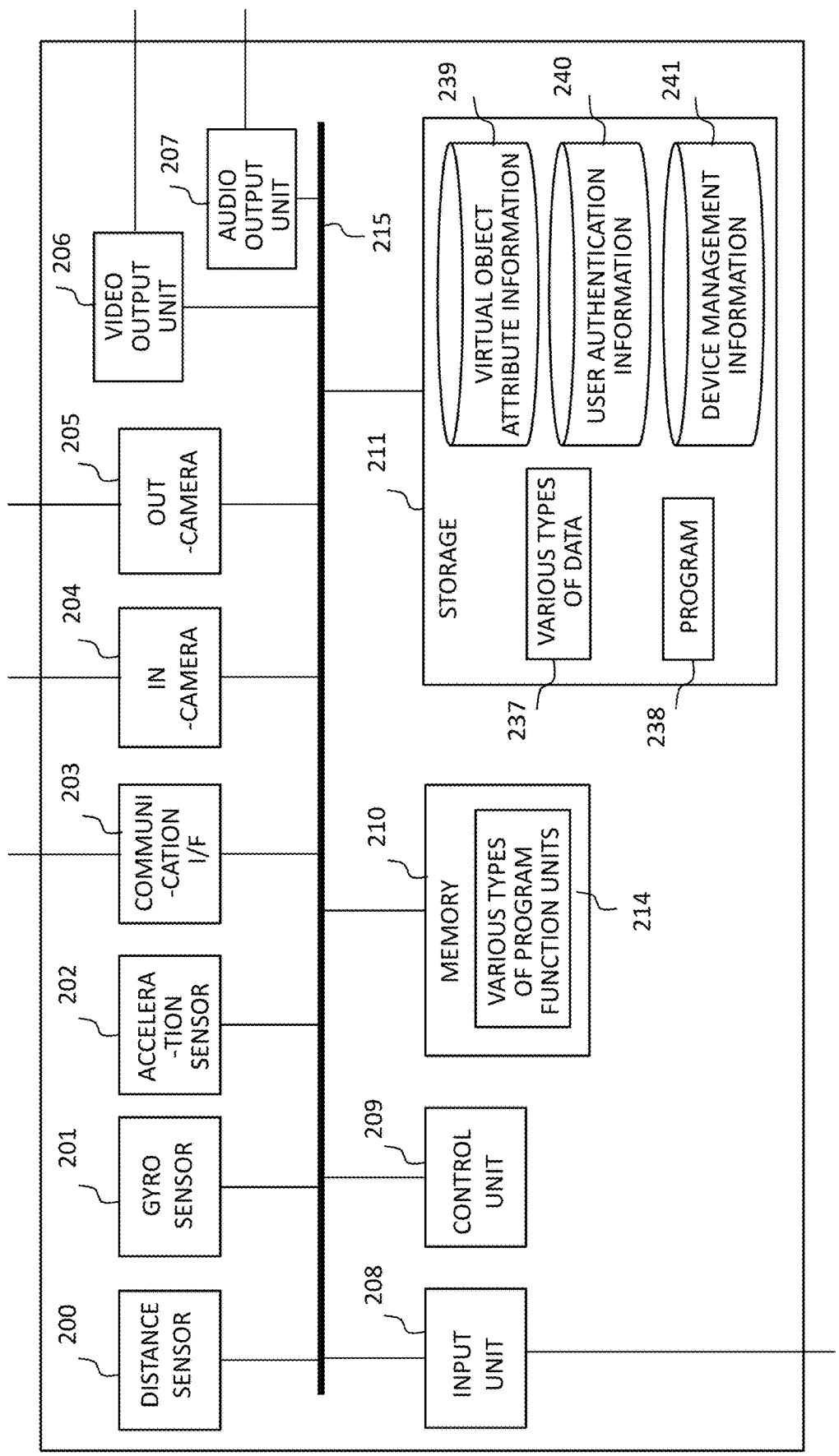
FIG. 13A is a diagram illustrating a hardware configuration of a mixed reality display terminal (with a built-in server function) 3c.

FIG. 13A is a diagram illustrating a hardware configuration of the mixed reality display terminal (with a built-in server function) 3c. The terminal 3b has the same configuration as that of FIG. 2A in the first embodiment. In the terminal 3c, the virtual object attribute information 239, the user authentication information 240, and the device management information 241 installed in the server 1 are additionally stored in the storage 211. The roles of the respective blocks are identical to those described in FIG. 3A in the first embodiment.

Figure 13B:
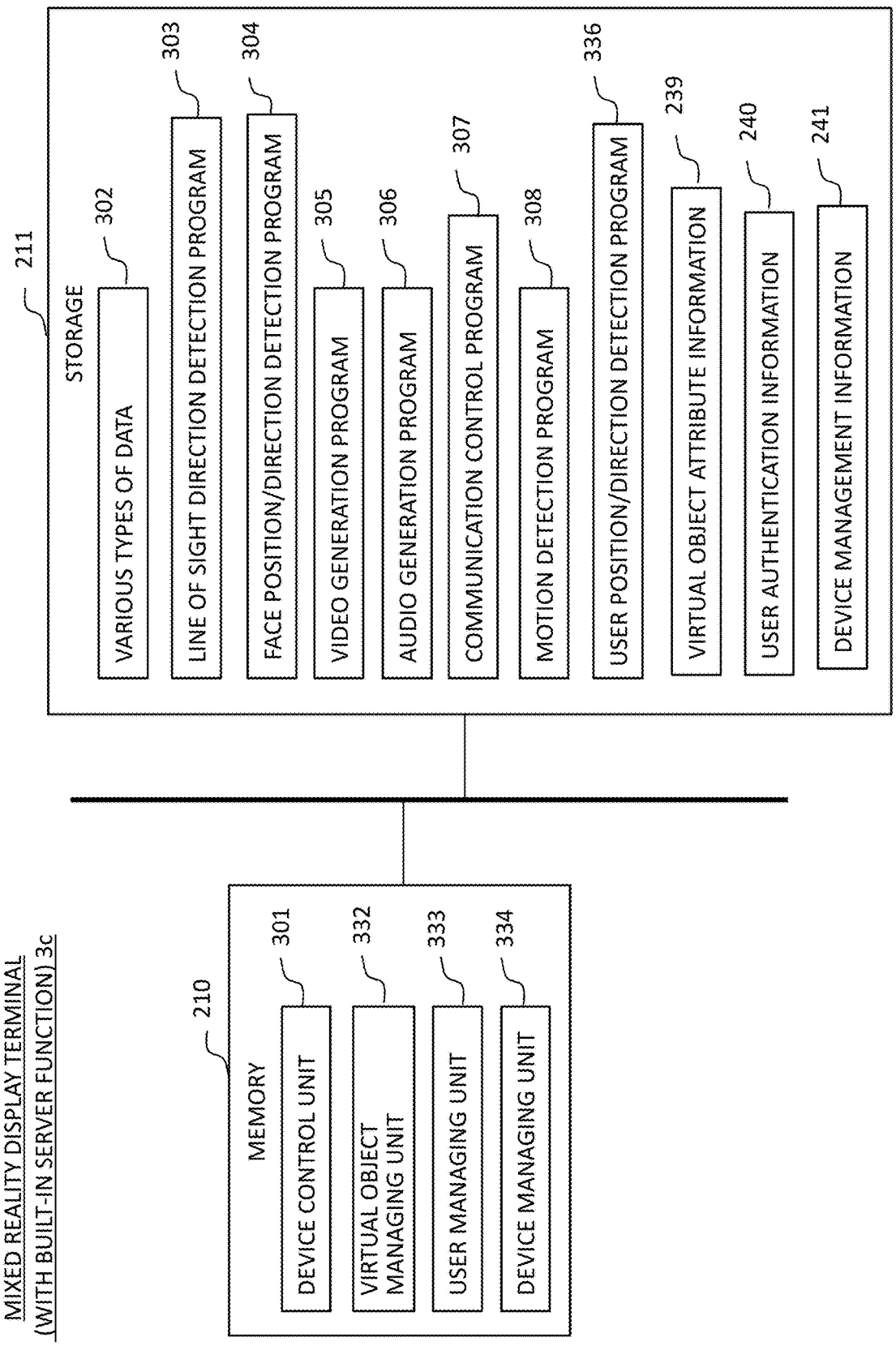
FIG. 13B is a diagram illustrating a software configuration of a mixed reality display terminal (with a built-in server function) 3c.

FIG. 13B is a diagram illustrating a software configuration of the mixed reality display terminal (with a built-in server function) 3c. The terminal 3b has the same configuration as that of FIG. 2B in the first embodiment. Here, configurations of the memory 210 and the storage 211 in FIG. 13A are illustrated.

In the terminal 3c, the virtual object managing unit 332, the user managing unit 333, and the device managing unit 334 installed in the server 1 are additionally stored in the memory 210. Further, the user position/direction detection program 336, the virtual object attribute information 239, the user authentication information 240, and the device management information 241 installed in the server 1 are additionally stored in the storage 211. The roles of the respective blocks are identical to those described in FIG. 3B in the first embodiment.

FIG. 14 is a diagram illustrating an operation sequence in the second embodiment. In this operation sequence, the terminal 3c also serves as the server 1 in the first embodiment. Therefore, communication between the terminal 3a and the server 1 in the first embodiment (FIG. 5) is omitted. That is, when the personalization motion (S104) or the sharing motion (S108) is performed in the terminal 3c, the built-in virtual object attribute information 239 is updated (S105 and S109), and the display state of the virtual object displayed by itself modified (S106 and S110). Also, the updated virtual object data is transmitted to the terminal 3b. The other operations are the same as those in the first embodiment (FIG. 5).

Although FIG. 14 illustrates a case in which the personalization motion and the sharing motion are performed in the terminal 3c, when the personalization motion and the sharing motion are performed in the terminal 3b, the detection information of the personalization motion and the sharing motion is transmitted to the terminal 3c, and the virtual object attribute information 239 stored in the terminal 3c is updated in a similar manner as described above.

According to the second embodiment, if the mixed reality display terminal is connected to the network, a plurality of users can share the same mixed reality space and easily perform the cooperative operations on the virtual objects.

In the above embodiment, one mixed reality display terminal 3c plays the role of the server, but all the mixed reality display terminals may play the role of the server and share the virtual object attribute information.

The present invention is not limited to the above-described embodiments and includes various modifications. The above-described embodiments are detailed explanation of the entire system in order to facilitate understanding of the present invention, and the present invention is not necessarily limited to those having all the configurations described above. Further, addition, deletion, or substitution of other components may be performed on some components of each embodiment.

Further, some or all of the components, the functions, the processing units, the processing means, or the like described above may be realized by hardware by designing them, for example, with an integrated circuit. Further, the components, the functions, or the like described above may be realized by software by interpreting and executing a program that realizes each function through a processor. A program that realizes each function and information such as a table or a file can be stored in a memory, a recording device such as a hard disk or a solid-state drive (SSD), or a recording media such as an IC card, an SD cards, or a DVD.

Further, control lines and information lines considered necessary for explanation are illustrated, but all control lines and all information lines in a product need not be necessarily illustrated. In practice, almost all the components may be considered to be connected to one another.

REFERENCE SIGNS LIST

1 Server
2 Network
3a, 3b Mixed reality display terminal (terminal)
3c Mixed reality display terminal (with built-in server function)
4a, 4b User
7, 8, 501, 502, 601, 602 Virtual object
10, 10' Mixed reality display system
200 Distance sensor
203, 231 Communication I/F
204 In-camera
205 Out-camera
206, 242 Video output unit
207, 243 Audio output unit
208 Input unit
209, 233 Control unit
210, 234 Memory
221, 235 Storage
239 Virtual object attribute information
332 Virtual object managing unit

The invention claimed is:

1. A mixed reality display terminal in a mixed reality display system in which virtual objects are displayed in real space in a mixed manner, wherein, in the mixed reality display system, a plurality of the mixed reality display terminals used by a plurality of users are connected to a server, the virtual objects include a shared virtual object for which an operation authority is given in accordance with an attribute information and a private virtual object for which only a specific mixed reality display terminal has an operation authority in accordance with an attribute information,
the mixed reality display terminal generates a switching operation instruction by the user for switching between the shared virtual object and the private virtual object,
the mixed reality display terminal transmits information to the server regarding the switching operation instruction to the attribute information of the virtual object necessary for displaying and operating the virtual object on each mixed reality display terminal, and
the mixed reality display terminal receives updated attribute information from the server based on the information about the switching operation instruction,
wherein the mixed reality display terminal includes a switching operation instruction detecting unit that detects the switching operation instruction by the user and determines a personalization instruction of copying the shared virtual object to generate the private virtual object or a sharing instruction of merging the private virtual object with the shared virtual object of a copy source.

2. The mixed reality display terminal according to claim 1,
wherein the mixed reality display terminal that has received the switching operation instruction of the virtual object by the user and the mixed reality display terminal that has not received the switching operation instruction of the virtual object by the user among the plurality of mixed reality display terminals are different in the virtual object attribute information for the same virtual objects displayed in the respective mixed reality display terminals and display the same virtual objects with a different color, luminance, shape, or voice.

3. The mixed reality display terminal according to claim 1,
wherein, in a process of switching a display based on the switching operation instruction by the user, each of the plurality of mixed reality display terminals displays the same virtual objects by gradually changing the color, the luminance, the shape, or the voice.

4. The mixed reality display terminal according to claim 1,
wherein the mixed reality display terminal that has received the switching operation instruction of the virtual object by the user and the mixed reality display terminal that has not received the switching operation instruction of the virtual object by the user display the same virtual objects at different positions in accordance with a distance between the virtual object and the user.

5. The mixed reality display terminal according to claim 1,
comprising a line of sight detecting unit that detects a line of sight direction of the user, and
the line of sight detecting unit detects that the line of sight of the user is placed on the virtual object, and then a display state for the virtual object is switched in accordance with the virtual object attribute information.

6. The mixed reality display terminal according to claim 1,
comprising a distance detecting unit that detects a distance from the virtual object, and
the distance detecting unit detects that the mixed reality display terminal approaches the virtual object by a predetermined distance, and then the virtual object is displayed with a different color, luminance, shape, or voice in accordance with the virtual object attribute information.

7. The mixed reality display terminal according to claim 1,
comprising a speed detecting unit that detects a speed or acceleration approaching the virtual object, and
the speed detecting unit detects that the mixed reality display terminal approaches the virtual object by a distance beyond a predetermined speed or acceleration, and then the virtual object is displayed with a different color, luminance, shape, or voice in accordance with the virtual object attribute information.

8. The mixed reality display terminal according to claim claim 1,
wherein, when the switching operation instruction detecting unit determines that the switching operation instruction by the user is the sharing instruction, the server asks the user to check whether or not a new shared virtual object is combined with parts not including each other among differences in a shape of the virtual object when the private virtual object is merged into the shared virtual object.

* * * * *